(12) United States Patent
Yoshida et al.

(10) Patent No.: US 6,293,149 B1
(45) Date of Patent: Sep. 25, 2001

(54) ACCELERATION SENSOR ELEMENT AND METHOD OF ITS MANUFACTURE

(75) Inventors: Hitoshi Yoshida; Shigeaki Tomonari, both of Osaka; Naomasa Oka, Kyoto; Takuro Nakamura, Yao; Takuro Ishida, Kawachinagano; Masanao Kamakura, Hirakata; Fumihiro Kasano, Sakai, all of (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/147,155

(22) PCT Filed: Oct. 22, 1997

(86) PCT No.: PCT/JP97/03811

§ 371 Date: Oct. 20, 1998

§ 102(e) Date: Oct. 20, 1998

(87) PCT Pub. No.: WO98/37425

PCT Pub. Date: Aug. 27, 1998

(30) Foreign Application Priority Data

| Feb. 21, 1997 | (JP) | 9-037271 |
| Jul. 30, 1997 | (JP) | 9-204269 |
| Aug. 29, 1997 | (JP) | 9-234114 |
| Aug. 29, 1997 | (JP) | 9-234116 |

(51) Int. Cl.[7] .............................. G01P 15/00; H01L 21/00

(52) U.S. Cl. ..................... 73/514.01; 73/514.32; 73/514.34; 438/52

(58) Field of Search .................... 73/514.01, 514.16, 73/514.32, 514.33, 514.34; 438/52, 50, 48, 14

(56) References Cited

U.S. PATENT DOCUMENTS

| 4,882,933 | 11/1989 | Petersen et al. . |
| 5,395,802 | 3/1995 | Kiyota et al. . |
| 5,485,749 | 1/1996 | Nohara et al. . |

FOREIGN PATENT DOCUMENTS

| 0461265 | 12/1991 | (EP) . |
| 0553856 | 8/1993 | (EP) . |
| 0631142 | 12/1994 | (EP) . |
| 2-81477 | 3/1990 | (JP) . |
| 5-26754 | 2/1993 | (JP) . |
| 5-217990 | 8/1993 | (JP) . |
| 5-340957 | 12/1993 | (JP) . |
| 6-109755 | 4/1994 | (JP) . |
| 6-331646 | 12/1994 | (JP) . |
| 7-14382 | 3/1995 | (JP) . |
| 7-234242 | 9/1995 | (JP) . |
| 8-236784 | 9/1996 | (JP) . |
| 8-274349 | 10/1996 | (JP) . |
| 9-45937 | 2/1997 | (JP) . |
| 9-153626 | 6/1997 | (JP) . |

OTHER PUBLICATIONS

English Language Abstract of JP No. 2–81477.
English Language Abstract of JP No. 5–26754.
English Language Abstract of JP No. 5–340957.
English Language Abstract of JP No. 6–109755.

(List continued on next page.)

*Primary Examiner*—Richard A. Moller
(74) *Attorney, Agent, or Firm*—Greenblum & Bernstein, P.L.C.

(57) ABSTRACT

A flexure transducer element used in an acceleration sensor for sensing an acceleration applied thereto and the method of making the same. The flexure transducer element comprises a frame, a sheet member, a weight, and a support member.

37 Claims, 33 Drawing Sheets

OTHER PUBLICATIONS

English Language Abstract of JP No. 7–14382.
English Language Abstract of JP No. 7–234242.
English Language Abstract of JP No. 8–236784.
English Language Abstract of JP No. 8–274349.
English Language Abstract of JP No. 9–45937.
English Language Abstract of JP No. 9–153626.

Schwarts, "Chemical Etching of Silicon", Solid–State Science and Technology, pp. 1903–1909, Dec. 1976.

US 6,293,149 B1

ACCELERATION SENSOR ELEMENT AND METHOD OF ITS MANUFACTURE

BACKGROUND OF THE INVENTION

1. Field of the Invention

The present invention relates to a flexure transducer element and a method of producing the same which is used for a semiconductor acceleration sensor having a both end supported beam structure and used for an automobile, an aircraft or a domestic electric appliance, and also relates to an acceleration sensor including such an element. For example, such a sensor can be used for sensing an acceleration by separately obtaining an X-axis component, Y-axis component and Z-axis component of the acceleration applied thereto with respect to an X-Y-Z coordinate rectangular system having the three axes.

2. Description of Background Information

The acceleration sensor as described above is disclosed in U.S. Pat. No. 5,485,749. The sensor is a piezoresistor-type acceleration sensor which converts a mechanical flexure (or a strain) of a member generated by an acceleration into an electric signal, and one example of such a sensor is shown in FIGS. 18 (a schematic perspective view) and 19 (a cross sectional view taken along a line A–A' in FIG. 18).

The acceleration sensor 500 includes a flexure transducer element 502 and a bottom cover 504. The flexure transducer element 502 includes a frame 506 and a sheet member 508. The frame 506 has an upper surface 510 and a lower surface 512 which is supported by a support member 514. The sheet member 508 includes flexible parts 515 and a center part 516 (a portion surrounded by the dash and dot lines in FIG. 18). The flexible part 515 extends outward from the center part 516 and integrally connects with an inner edge 518 of the frame 502. A weight 520 connects with the center part 516 of the sheet member 508 below the center part 516.

An inward side surface 524 of the support member 514 is facing to an outward side surface 526 of the weight 520 through a first space 528. Further, a second space 530 is present between the flexible parts 515 and the weight 520, and connects with the first space 528. In addition, there is a third space 532 which is surrounded by the frame 506 and the flexible parts 515. The flexible parts 515 include a plurality of piezoresistors 534 and wirings (not shown) connected thereto on their surfaces.

The bottom cover 504 includes a periphery part 541 which defines a recess part 540 corresponding to and surrounding the weight 520, and the support member 514 is bonded to the periphery part of the bottom cover 504 by an appropriate means such as anodic bonding. The bottom cover 504 functions as a stopper which prevents the sheet member 508 from being broken due to over-displacement of the weight when an excessive acceleration is applied.

When the acceleration sensor 500 as described above includes the plurality of the piezoresistors 534, it can be used as the acceleration sensor which detects the acceleration by obtaining separately the X, Y and Z axis components of the acceleration applied to the sensor with respect to the X-Y-Z three axis regular coordinate defined by the X, Y and Z axes which regularly intersecting with one another (the X axis and the Y axis extend over the upper surface defined by the sheet member 508 and the frame 506).

Interconnections between the frame 506 and the sheet member 508 as well as between the sheet member 508 and the weight 520 are such that when the acceleration is applied to the sensor 500, concretely to the element 502, at least a portion of the flexible part 515 which portion has the piezoresistor 534 is elastically deformed by the displacement of the weight 520 relative to the frame 506 (it is noted that the center part 516 of the sheet member 508 which is connected to the neck part 522 is substantially not deformed), and thereby a resistance change of the piezoresistor 534 is converted to an electric signal. By detecting the signal, the acceleration applied to the sensor is determined.

The production of the acceleration sensor as described above can be carried out based on a method disclosed in the U.S. Pat. No. 5,485,749, and concretely carried out as follows using a production sequence as shown in FIG. 20 which shows schematic cross sectional views similar to FIG. 19:

FIG. 20(*a*): First, a silicone nitride films 602 and 604 are formed on the both surfaces of a first silicon substrate 600 from which the support member 514 and the weight 520 are to be formed.

FIG. 20(*b*): Then, an opening 606 is formed by removing a portion of the silicon nitride film 602 which corresponds to the second space 530, and an opening 608 is formed by removing a portion of the silicon nitride film 604 which corresponds to the first space 528.

FIG. 20(*c*): By digging from the openings 606 and 608 to form recess parts 610 and 612 respectively, and then remaining silicon film 602 is removed so that one surface of the first silicon substrate 600 is exposed, on which a second silicon substrate 616 is laminated so that a portion of the recess part 610 is formed into the second space 530 and the rest part is formed into the neck part 522 of the weight and the upper surface of the support member 514.

FIG. 20(*d*): In order that the flexible part 515 is deformed upon the application of the predetermined acceleration when finally completed as the sensor, the second silicon substrate 616 is thinned to a thickness (t) by grinding or etching, whereby the second silicon substrate is formed into the sheet member 508 and the frame 506.

FIG. 20(*e*): Then, the piezoresistors 618 are formed on the sheet member 508 of the thinned second silicon substrate 616 using diffusion of an impurity of which conductivity type is different from that of the second silicon substrate 616.

FIG. 20(*f*): Then, after wirings (not shown) connected to the piezoresistors 618 are formed, a first space 528 reaching the third space 530 is formed by anisotropic etching from the recess part 612 so that the weight 520 is connected to and supported integrally by the center part 516 of the second silicon substrate 616 through the neck part 522.

Finally, the predetermined portion of the second silicon substrate 616 is etched so that the third space 532 (not shown) is formed, whereby the flexure transducer element 502 is obtained. It is noted that the silicon nitride film 604 on the bottom surface of the first silicon substrate may be optionally removed.

The element 502 thus obtained is bonded to a bottom cover 504 (not shown in FIG. 20), which results in the piezoresistor-type acceleration sensor.

Alternatively, the following method is also known: the second space 530 is not formed directly from the substrate, but a portion which corresponds to the second space is once formed as a sacrificial layer of a polysilicon, and then the sacrificial layer is removed by supplying an etchant through the first space 528 after the first space 528 has been formed (see Japanese Patent Kokai Publication No. 7-234242 and its counterpart foreign patent applications if any and U.S. Pat. No. 5,395,802).

In such an acceleration sensor, the acceleration to be detected is converted to a flexure of the flexible part as at least a portion of the sheet member, so that the resistance of the piezoresitor formed on the flexible part is changed by means of the flexure, whereby finally the acceleration is converted to the electric signal.

Therefore, the sensitivity of the semiconductor acceleration sensor is controlled by particularly the thickness of the flexible part of the sheet member which is elastically deformed (or flexed). That is, when the flexible part becomes thicker, the sensitivity becomes worse, and the sensitivity is affected by scattering of the thickness of the flexible part. Thus, the uniform and precise control of the thickness of the sheet member is important in the production process of the semiconductor acceleration sensor.

As another type of the sensor, an electrostatic capacitance-type sensor is also known, and it is disclosed in for example Japanese Patent Kokai Publication No. 5-26754 and its counterpart foreign patent applications (if any) and Europe Patent Publication No. 0 461 265. Operation mechanism of such a sensor is similar to the piezoresistor-type sensor in that it is based on the mechanical flexure formed by the application of the acceleration. However, it is different from the piezoresistor-type sensor in that the flexure is converted to relative displacement between two opposing members, and the displacement changes the electrostatic capacitance between electrodes provided on the members, which is utilized in the electrostatic capacitance-type sensor. Thus, in the electrostatic capacitance-type sensor, the electrodes are provided on the member which is displaced and the member which is not displaced upon the application of the acceleration sensor so that these electrodes are opposing to each other.

Such an acceleration sensor is shown in FIGS. 21 (a schematic partially cut-away perspective view) and 22 (a schematic cross sectional view taken along a diagonal C–C' in FIG. 21). While the above flexure transducer element 502 includes the piezoresistors 534, the flexure transducer 702 of the acceleration sensor 700 includes in place of the piezoresistors, the electrode 734 on the upper surface of the weight 520 and the wiring 736 connected thereto, and the wiring is provided on the sheet member through the depressed corner 738 of the third space, The other features are substantially the same as those of the above piezoresistor-type flexure transducer element 502 shown in FIGS. 18 and 19.

It is noted that the flexure element 702 of the electrostatic capacitance-type is used with the top cover 740 (not shown in FIG. 21) which is located on the element. The top cover 740 prevents excessive displacement of the weight, whereby prevents break of the flexible parts, and includes on its inside, a recess part which corresponds to at least the sheet member and preferably an upper surface of the element except the frame. This kind of top cover is combined with the element for the piezoresitor-type acceleration sensor or the electrostatic capacitance-type acceleration sensor, provided that in the latter type sensor, the top cover includes an electrode as described below. The top cover 740 includes the electrode 742 which faces to the electrode 734 when the cover is placed on the element 702. In such an acceleration sensor, when the acceleration to be detected is applied to the sensor, the weight 520 is displaced relatively to the support member 514 and thus the cover 740 arranged thereon since the weight 520 is connected to the sheet member 508 including the flexible parts 515. As a result, a distance between the electrode 734 on the weight and the electrode 742 opposing thereto on the cover is changed, whereby the acceleration can be sensed using an electrostatic capacitance change between the electrodes which is caused by the distance change.

Also in this acceleration sensor of the electrostatic capacitance-type, when the thickness of the flexible part 515 is thinner, and also when the length of the flexible part is longer in the case of the flexible part being in the elongated form, the flexible part is more likely to be deformed even with a smaller acceleration, which improves the sensitivity of the acceleration sensor. Also, when the thickness of the flexible part has scattering, scattering of the sensitivity occurs.

Therefore, in any type of the acceleration sensor, it is desirable that the thickness of the flexible part is properly controlled so that the semiconductor acceleration sensor or the flexure transducer element is provided which includes the flexible part having less scattering in their thickness. Thus, it is important to precisely control the uniform thickness of the flexible parts in the production method of the transducer element. Further, when the flexible part is in the elongated form, it is preferable that its length can be longer.

In the production method of the prior art for the semiconductor acceleration sensor as described above provides such a sensor having a both end supported beam structure in which the weight is connected to the center part of the sheet member, the flexible parts of the sheet member are connected to the frame, and the frame is supported by the support member.

In this production method, since the thickness scattering of the second silicon substrate is large in the step of thinning the second silicon substrate up to the predetermined sheet form thickness (t) after laminating the second silicon substrate 616 onto the first silicon substrate 600, it is difficult to control the thickness of the flexible part 515 uniformly. Further, lamination of the silicon substrates is complicated and two pieces of the silicon substrates are required, which increases the production cost.

SUMMARY OF THE INVENTION

The present invention is based on the above consideration as to the problems as described above, and objects of the present invention are to overcome the above problems and thereby to provide a flexure transducer element used for the semiconductor acceleration sensor and also a production method of the element, which includes a both end supported beam structure in which the sheet member, especially its flexible part thickness is formed with precisely controlling its thickness, and also to provide an acceleration sensor using such an element. Further, the present invention provides preferred embodiments of such an element, its production method and such a sensor, and advantages achieved by the present invention will be clarified with reference to descriptions below and the accompanied drawings.

The inventors have intensively studied the structure of the semiconductor sensor and the production method thereof under the consideration of the above problems, and found that when the sheet member and the frame are formed of an epitaxial layer, the above problems are overcome.

Thus, in the first aspect, the present invention provides a flexure transducer element which is used in an acceleration sensor for sensing an acceleration applied thereto comprises (1) a frame having an upper surface and a lower surface, (2) a sheet member which has a plurality of flexible parts and a center part, each flexible part extending between at least a portion of an inner edge of the frame and the center part and being integrally connected to them, (3) a weight which has a neck part integrally connected to the center part of the sheet member and which is hung from the sheet member through the neck part, and (4) a support member which supports the lower surface of the frame and of which inward side surface faces to a side surface of the weight through a first space therebetween, a second space which is continuous with the first space is defined between each flexible part of the sheet member and the weight, a third space is defined between the frame and the sheet member and/or through the sheet member, the frame and the sheet member are connected to each other and the sheet member and the weight are connected to each other in such a manner that, when the acceleration is applied to the element, at least two flexible parts are elastically deformed so that the weight is displaced relatively to the frame, the weight and the support member are formed of a semiconductor substrate, the second space is formed by removing a sacrificial layer (or a sacrifice layer) which is provided in the semiconductor substrate, and the frame and the sheet member comprises an epitaxial layer provided on the semiconductor substrate.

For example, the element can be used for an acceleration sensor such as a piesoresistor-type or electrostatic capacitance-type acceleration sensor which senses the acceleration by separately an X-axis, a Y-axis and a Z-axis components of the acceleration applied to the sensor with respect to an X-Y-Z three coordinate system which is defined by the three axes which intersect with one another. In this case, the X-axis and the Y-axis are so defined that they extend on an upper surface of the sheet member.

In the present invention, the flexure transducer element is intended to mean an element which converts the flexure in the acceleration sensor (such as the piesoresistor-type or electrostatic capacitance-type acceleration sensor as described above) into an electric output.

It is noted that in principle, the same terms are used for members and parts for the present device as in used for the members and the parts for the prior art device described above in descriptions as to the present invention.

In the element according to the present invention, the weight and the support member are made of a single semiconductor substrate, and the frame and the sheet member are made of the epitaxial layer grown on the semiconductor substrate. The weight, the frame, the sheet member and the support member are so connected that they constitute a structure in which at least a portion of the flexible part of the sheet member is elastically deformed (or flexed) when the acceleration is applied to the element, The sheet member is formed of the epitaxial layer as described above in the present invention, the element having the flexible parts each having a more uniform thickness is provided when compared with the element produced by the prior art method in which the silicon substrate is laminated followed by mechanically reducing its thickness.

In one preferable embodiment of the flexure transducer element according to the present invention, the first space and the second space define side surfaces of the weight, the weight has such a structure that it is connected to the center part of the sheet member through the narrow neck part. That is, when considering a cross section of the weight which is parallel to the semiconductor substrate, the neck area is smaller than the other portion of the weight and the cross section of the neck part is located in the center of the other portion.

The form of the weight is not particularly limited. For example, when the element has an overall form of a square prism, the weight may be substantially in the form of the square prism except the neck part. The neck part may be a square prism (or a column) form having a small height which is included by and concentric with the square (or quadratic) prism. In order to make the volume of the weight as much as possible relatively to the total volume of the element, the neck part is preferably as small as possible, and the cross sectional area of the weight is preferably as large as possible. It is of course that the weight does not have to be larger when the small weight is sufficient. It is noted that the weight may be made of only the semiconductor substrate or made of the semiconductor substrate and a portion of the epitaxical layer which is formed thereon.

In one preferable embodiment of the flexure transducer element according to the present invention, the flexible parts of the sheet member include at least two portions each being able to elastically deform upon the application of the acceleration and having at least one piezoresistor, and each of the piezoresistors has a wiring connected thereto. The wiring may be any wiring which can send information or output related to an electric signal converted from resistance change of the pieozoresistor. For example, the wiring may be a metal wiring and/or a diffusion wiring. Further, when the wiring is the metal wiring, it may be connected directly to an electrode pad, or when the wiring is the diffusion wiring, it may be connected to the electrode pad through the metal wiring. Through the electrode pad, the element is connected to an apparatus in which the element measures a piezoresistance.

The position where the piezoresistor is located is not particularly limited provided that the flexure of the flexible part can be electrically detected. In fact, there are various arrangements of the piezoresistors, but it is preferable that it is located at a position of the flexible part where the elastic flexure (or deformation) is concentrated. As to the concrete arrangement of the piezoresistors are disclosed in U.S. Pat. No. 5,485,749 and Japanese Patent Kokai Publication Nos. 6-331646, 6-109755 and 7-234242 and their counterpart foreign patent applications (if any), the disclosures thereof are referred to for the concrete arrangement of the piezoresistors in the present invention. It is noted that the disclosures are incorporated herein by these references.

Also, it is noted that such an element is connected with the bottom cover and the top cover as described above, which results in the acceleration sensor. Therefore, the present invention provides the piezoresistor type acceleration sensor which includes the element as described above and the bottom cover and the top cover. As described above, the bottom cover and the top cover have the recess parts on their inward sides, and when an excessive acceleration is applied to the acceleration sensor, they prevent the sensor, particularly the flexible parts from being broken.

In one preferable embodiment, the flexure transducer element according to the present invention includes at least one electrode for the electrostatic capacitance measurement on at least one portion (for example, a portion of the sheet member or the weight upper surface) which is displaced by the elastic deformation of the flexible parts upon the application of the acceleration. The electrode includes a wiring connected thereto. The wiring may be any wiring which can send output related to the electrostatic capacitance measurement. For example, the wiring may be a metal wiring. Further, when the wiring is the metal wiring, it may be connected directly to an electrode pad, or when the wiring is the diffusion wiring, it may be connected to the electrode pad through the metal wiring. Through the electrode pad, the element is connected to an apparatus in which the element measures the electrostatic capacitance.

The position where the electrode for the electrostatic capacitance measurement is located is not particularly limited provided that it constitutes an electrode which is relatively displaced to an electrode of the top cover provided above the element while the electrode is opposing to said electrode of the top cover. Various arrangements may be possible as to the electrode, but the electrode is preferably provided on a portion of which displacement due to the deformation of the flexible parts is large. For example, the electrode may be provided on a portion of the upper surface of the weight near its outer periphery as shown in FIG. 21 (for example, the electrode 734). More concrete arrangements as to the electrode for the electrostatic capacitance measurement are disclosed in Japanese Patent Kokai Publication No. 5-26754 and its counterpart foreign patent applications (if any) and Europe Patent Publication (A1) No. 0 461 265, and the disclosures thereof are referred to for the concrete arrangement of the electrode for the electrostatic capacitance measurement in the present invention. It is noted that the disclosures are incorporated herein by these references.

Such an element is connected with the optional bottom cover and the top cover as described above, which results in the acceleration sensor. Therefore, the present invention provides the electrostatic capacitance-type acceleration sensor which includes the element as described above and the bottom cover and the top cover. As described above, the bottom cover and the top cover have the recess parts on their inward sides, and when an excessive acceleration is applied to the acceleration sensor, they prevent the sensor, particularly the flexible parts from being broken. It is noted that the top cover includes the electrode which faces to the electrode provided on the element.

The element as described above according to the present invention is produce by the following method. Therefore, the present invention provides a method for the production of the flexure transducer element which is used for the acceleration sensor according to the present invention as described above and below, the method comprising the steps of:

(1) forming in the first main surface of the semiconductor substrate for the formation of the weight having the neck part and the support member, the sacrificial layer which extends outward from a portion of an outer periphery of the center part of the first main surface which center part is to constitute the neck part, (2) the epitaxial layer is formed on the first main surface after step (1), and (3) after step (2), carrying out the following sub-steps (3-a) to (3-c):

(3-a) removing a portion of the substrate from the second main surface of the substrate using etching so that the side surface of the weight and the support member are formed, the support member including the side surface opposing to the side surface of the weight through the first space, (3-b) forming the third space through the epitaxial layer by removing a portion thereof using etching so that at least a portion (optionally substantially all) of the rest of the eptaxial layer is formed into the frame and the sheet member including the center part and a plurality of the flexible parts which finally becomes able to elastically deform, and (3-c) removing the sacrificial layer through wet etching so that the second space and the neck part of the weight are formed, whereby the weight is formed, in any one of the following sub-step orders (i) to (iv):

(i) sub-step (3-a)→sub-step (3-b)→sub-step (3-c),
(ii) sub-step (3-a)→sub-step (3-c)→sub-step (3-b),
(iii) sub-step (3-b)→sub-step (3-a)→sub-step (3-c), and
(iv) sub-step (3-b)→sub-step (3-c)→sub-step (3-a).

DETAILED DESCRIPTION OF PREFERRED EMBODIMENTS OF THE INVENTION

Figure 1:
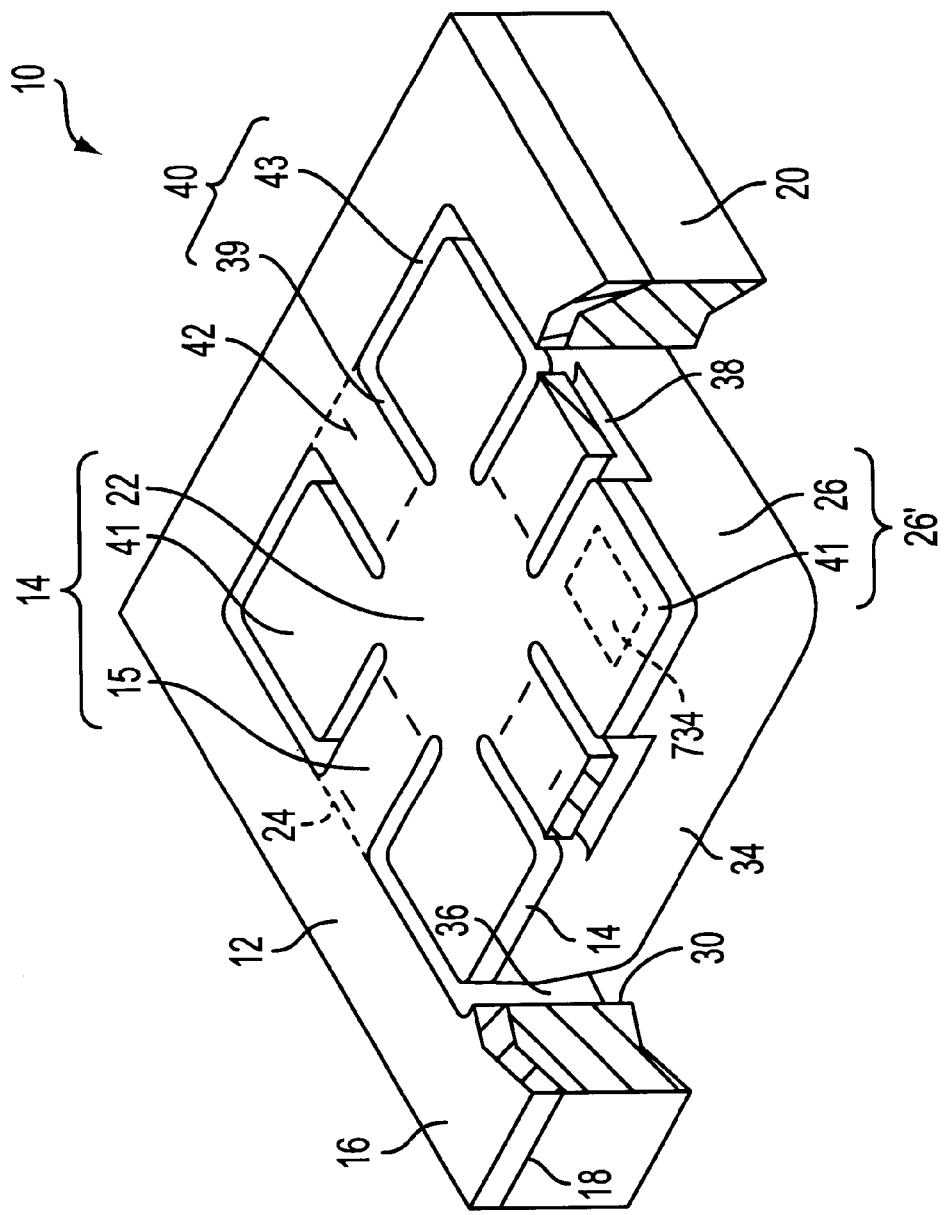
FIG. 1 schematically shows a partially cut-away perspective view of an element for a piezoresitor-type acceleration sensor according to the present invention.

The semiconductor substrate used in the method according to the present invention may be a silicon substrate, and its conductivity type may be either a P-type or an N-type. The weight and the support member are made of this substrate. As the semiconductor substrate, for example an N-type substrate may be used of which orientation of a crystal plane (crystal surface indices) is (100). An impurity concentration of the substrate is desirably not more than $1.0 \times 10^{17}$ cm$^{-3}$ (for example, in the range between $1.0 \times 10^{14}$ cm$^{-3}$ and $1.0 \times 10^{16}$ cm$^{-3}$). When the substrate having such an impurity concentration is used, an etching speed is reduced to about 1/150 or less of an etching speed when using a substrate having a larger impurity concentration, so that a layer having such a smaller impurity concentration is left as a low impurity concentration layer even when a layer having a larger impurity concentration is removed by etching. Further, a thickness of the substrate is not particularly limited, and it may be selected appropriately depending on an application of the sensor. Generally, the thickness of the substrate may be the same as or a little thicker than that of the conventionally used substrate for the acceleration sensor. For example, the substrate having a thickness of 400 μm to 600 μm may be used. On one of main surfaces of such a substrate is formed the sacrificial layer. The term "sacrificial layer" is used to mean a layer which is present during the production method of the element according to the present invention, but finally removed to provide a space.

The sacrificial layer extends outward from a portion corresponding to a center portion of the semiconductor substrate. The center portion is a portion which is to become the neck part of the weight and finally connected to the center part of the sheet member, and no sacrificial layer is formed in the center portion. A shape of the center portion of the semiconductor substrate is not particularly limited, and for example it may be a circle or a rectangle (square, oblong). Particularly, it is preferable that the center of gravity of the weight is below the center portion, especially below the central point of the center portion of the substrate. The sacrificial layer extends outwardly from an outer periphery of the center portion of the substrate. The sacrificial layer may extend from an entire of the outer periphery of the center portion (i.e. a whole periphery of the center portion so as to enclose the center portion) so as to enclose the center portion, or from a portion of the outer periphery of the center portion.

When the sacrificial layer extends from the entire of the outer periphery, it may be an annular shape. For example, the center portion of the substrate is of a circular shape, and the sacrificial layer is formed by a circle which is concentric with that circular shape of the center portion, and thus the sacrificial layer may be an annular portion between the concentric circle and the center portion. In other embodiment, the center portion is of an inner square, and the sacrificial layer is formed by another outer square which is concentric with that inner square, and thus the sacrificial layer may be an annular portion between the inner square and the outer square. The sacrificial layer may be a portion formed by combination a circular center portion with an outer square or vice versa. In place of the square, a rectangular and in place of the circle, an oval may be used.

When the sacrificial layer extends from a portion of the outer periphery of the center portion, the sacrificial layer may be substantially elongated layers which extend at an evenly spaced angle (for example 90°) from the periphery of the center portion. In case where the angle is 90°, the sacrificial layer is in the form of four beams which are opposing through the center portion with each other (i.e. the cross-shape having an intersection point in its center). In other words, the sacrificial layers may extend radically from the center portion, and the number of the sacrificial layers is not limited, but usually four is enough. Further, in other embodiment, the elongated sacrificial layers preferably extend symmetrically (with respect to a point or an axis) from the center portion of the substrate.

It is noted that a thickness of the sacrificial layer substantially corresponds to a distance between the flexible part and an upper surface of the weight (thus, a thickness of the second space), and therefore is selected depending on an application of the sensor. For example, the thickness may be for example 5 to 15 μm.

In the method according to the present invention, the sacrificial layer contains the impurity of which conductivity type is the same as or opposite to that of the impurity of the substrate body, and may be provided by forming a portion of which impurity concentration is larger than that of the substrate (i.e. forming the high impurity concentration layer) in the surface of the substrate, or forming a porous silicon layer in the surface of the substrate.

Those skilled in the art may easily select the impurity concentration of the high impurity concentration layer based on etching conditions, an etching path and so on while considering the impurity concentration of the substrate body. For example, when the impurity concentration of the substrate body is in the range between about $1.0 \times 10^{14}$ cm$^{-3}$ and about $1.0 \times 10^{16}$ cm$^{-3}$, the impurity concentration of the high impurity concentration layer may be in the range between about $1.0 \times 10^{18}$ cm$^{-3}$ and about $1.0 \times 10^{20}$ cm$^{-3}$ (or a solid solubility).

It is known that when the sacrificial layer is removed by etching, the impurity concentration in the sacrificial layer is increased so as to improve an etching selectivity ratio (i.e. a ratio of an etching speed as to a certain material to another etching speed as to another certain material). (For example, see B. Schwarts, "Chemical Etching of Silicon", SOLID-STATE SCIENCE AND TECHNOLOGY, pp 1903–1909, December 1976.)

The porous silicon layer as the sacrificial layer may be provided by forming a silicon oxide film on a silicon substrate, then forming through the silicon oxide film, an opening corresponding to the sacrificial layer, and then carrying out the deposition and the thermal diffusion or the ion implantation and the annealing treatment of for example a P-type impurity through the opening followed by anodic oxidation in an electrolyte solution (for example a solution containing hydrofluoric acid).

The formation of the sacrificial layer having a predetermined shape may be carried out by the ion implantation and the annealing treatment or the deposition and the thermal diffusion after masking with a photoresist. The thickness and the impurity concentration of the sacrificial layer may be controlled by appropriately selecting operation conditions upon the formation. These technical knowledge is well-known to those skilled in the art.

Then, the epitaxial layer is formed on an entire surface on the side of the substrate which side has the sacrificial layer in step (2). Since the epitaxial layer finally constitutes the sheet member of the element, its thickness has to be such that the sheet member is able to elastically deform so that the acceleration is detected with a predetermined sensitivity. When the thickness is thinner, the smaller acceleration can be detected since deformation is possible even by a small acceleration, but the sheet member is likely to be broken, and vice versa. Therefore, depending on a predetermined application of the element, the thickness has to be selected. The formation method of the epitaxial layer is well-know to those skilled in the art. As to the formation of the eptaxial layer on the porous silicon layer, Japanese Patent Kokai Publication No. 5-217990 and its counterpart foreign patent applications (if any) may be referred to, and the disclosures therein are incorporated herein by these references.

In step (3), various etching is carried out so as to form the sheet member, the support member, the weight, the first space, the second space and the third space. As to the order of sub-steps (3-a) to (3-c) in step (3), there is no limitation in the order of the sup-steps provided that sub-step (3-c) is not carried out at first.

In sub-step (3-a), the substrate is etched so that the support member, the side surface of the weight and the first space between them are formed. Etching is carried out from the side of the second main surface (i.e. the surface which does not include the eptaxial layer) of the substrate so that a portion of the substrate is removed. This etching is so carried out that the first space is present around the weight and the support member surrounds the first space. In one preferable embodiment, the substrate is a sheet in the form of a square, the support member is a wall member which is located on four edge periphery of the square and surrounds the square, and within the wall member, the weight having a square cross section (parallel to the main surface of the substrate) is located so that the first space is present between the wall member and the weight. The cross section of the weight is not necessarily the square, and it may be for example, circular, rectangular and so on. However, from a viewpoint that the weight is to be as large as possible, the cross section of the weight is preferably the square when the substrate has a square shape. When the substrate is rectangular, the weight preferably has a rectangular shape in its cross section which is similar to the rectangle of the substrate.

Sub-step (3-b) forms the third space in the epitaxial layer as an through opening and thereby the flexible parts are so formed that they are finally able to elastically deform, and also forms the frame. This is based on that by forming the eptaxial layer into the sheet form which includes the through opening so that the epitaxial layer partially includes the elongated parts rather than the epitaxial layer being flat and wide, the epitaxial layer is likely to elastically deform. In one embodiment, the eptaxial layer which is left by the formation of the third space in this sub-step constitutes in addition to the frame and the sheet member, the weight upper part (part 41 of FIG. 1 or part 91 of FIG. 6(*a*)). It is noted that no sacrificial layer is present in the substrate which is located below the weight upper part. Therefore, the weight upper part and the substrate remain integral together all the time. Even after sub-step (3-b) is completed, the flexible parts cannot be elastically deformed when the sacrificial layer is present below the flexible parts, and become able to elastically deform first after the sacrificial layer is removed. In this meaning or in the meaning "upon being completed as the element", the term "finally" is used.

Sub-step (3-c) removes the sacrificial layer through etching so that the second space and the neck part of the weight are formed. When the first space and/or the third space are not formed, the second space cannot be formed. Therefore, this sub-step cannot be carried out first.

Those three kinds of spaces forms a single space together.

Etching is used in the sub-steps of step (3). Depending on the shape and size of the space to be formed in any of the sub-steps, anisotropic etching (including the reactive ion etching (RIE)) or isotropic etching is used. In principle, the anisotropic etching is used for the formation of the first space and the third space, and the isotropic etching is used for the second space. These etching methods are well-known to those skilled in the art, and in order to carry the method according to the present invention, the methods disclosed in for example Japanese Patent Kokai Publication Nos. 2-81477 and 5-340957 and their counterpart foreign patent applications (if any) and U.S. Pat. No. 4,882,933.

In the method according to the present invention, step (3) may comprise sub-step (3-d) of forming at least one piezoresistor on at least one flexible part of the epitaxial layer. Before or after forming the piezoresistor, a wiring may be formed which is connected to the piezoresistor. Instead of sub-step (3-d), step (3) may comprise sub-step (3-e) of forming an electrode for the electrostatic capacitance measurement on a portion of the epitaxial layer which is displaced relatively to the frame upon the application of the acceleration, especially on that portion which constitutes the weight (namely on the weight upper part). Before or after, or simultaneously with the formation of this electrode, a wiring which is connected thereto may be further formed. When the weight does not include the epitaxial layer (namely, when the weight is made of only the substrate), the electrode may be formed on the weight. In this case, the electrode is formed after the formation of the third space. Sub-step (3-d) or (3-e) may be carried out in any stage during step (3) except the last embodiment. The wiring connected to the piezoresistor is preferably a diffusion wiring. The electrode for the electrostatic capacitance measurement is preferably a metal wiring. Further, when etching is carried out after such a piezoresistor or electrode and optionally the wiring if any have been formed, the epitaxial layer which includes the piezoresistor or electrode and the optional wiring is preferably protected by a protection film, for example a silicon oxide film and/or a silicon nitride film in order to avoid an effect of the etching which is subsequently carried out.

Thus, step (3) may comprise after sub-step (3-d) or (3d), sub-step (3-f-1) of providing the protection film which covers the piezoresistor or electrode and the optional wiring. The protection film may be at least one film, and when it is formed as two layers by laminating them, there is an advantage that the flatness of the substrate is kept if the layers are arranged while their bending directions are opposed to each other.

In order that an electric signal is transferred to other member, for example a signal processing apparatus from the piezoresistor or the electrostatic capacitance measurement electrode directly or through a wiring connected to the piezoresistor or the electrostatic electrostatic capacitance measurement electrode, another wiring such as a metal wiring and a pad electrode connected thereto may be provided with the element. When such a wiring and a pad electrode are provided, the protection layer on the predetermined portion of the piezoresistor (or the electrostatic electrostatic capacitance measurement electrode) or on the predetermined portion of the wiring connected the piezoresistor (or the electrostatic electrostatic capacitance measurement electrode) is removed, and another wiring which is directly connected to the piezoresistor (or the electrostatic electrostatic capacitance measurement electrode) is formed, or another wiring and the electrode pad are formed which are connected to the wiring connected to the piezoresistor (or the electrostatic electrostatic capacitance measurement electrode). When etching is carried out after forming said another wiring and the electrode pad, a wiring protection layer is preferably formed which protects said another wiring and the electrode pad, so that an effect on them of the etching can be avoided. Thus, when said another wiring and the electrode pad are formed after sub-step (3-f-1) after sub-step (3-d) or (3-e), and then etching is subsequently carried out, sub-step (3-f-2) of forming the wiring protection layer may be included which protects said another wiring and the electrode pad.

Thus, step (3) of the present method may comprises sub-step (3-f) of upon the formation of the piezoresistor or the electrostatic capacitance measurement electrode, the wiring or the electrode pad, forming the wiring protection layer which protects them before etching if they are affected by etching which is subsequently carried out.

In step (3) of the present method, the removal of the sacrificial layer may be carried out after the first space has been formed, or after the third space has been formed, or after the first space and the third space have been formed. When the first space or the third space has been formed, an etchant which removes the sacrificial layer can be supplied through the space. The introduction of the etchant may be carried out through the first space and/or the third space.

When the third space leading to the sacrificial layer is formed and the etchant is supplied through the space, the third space is preferably formed in a portion through the epitaxial layer which portion is located above the sacrificial layer to be removed (for example a portion of the epitaxial layer which portion is to be the flexible part) and/or another portion adjacent to said former portion. It is more preferable that the third space is formed on all of the epitaxial layer located on the sacrificial layer to be removed excluding a portion to be the flexible parts. The formation of the third space may be carried out in any etching method depending on the shape of the space, and generally anisotropic etching is used.

For example, when the sacrificial layer is elongated and that portion of the epitaxial layer which is above the sacrificial layer (thus, said portion is also elongated similarly) is converted into the flexible part, the third space is formed in the epitaxial layer so that it is located outside and adjacently to the flexible part to be formed, and at least partially and preferably entirely along the periphery of the flexible part to be formed. When the third space is formed in this way, etching can be carried out along a direction perpendicular to the longitudinal direction of the flexible part (namely, a width direction of the flexible part) from a position along the longitudinal direction of the flexible part, while when the second space is formed after the formation of the first space, etching has to be carried out from the periphery of the weight toward its center portion. Thus, in the former case, there is an advantage in that a path which etching has to follow is shortened (therefore, a period for the removal with etching can be reduced).

Alternatively, the third space may be formed in a portion of the epitaxial layer which portion corresponds to the flexible part such that the space passes through the epitaxial layer. Also in this case, the third space is preferably formed so that it extends along the longitudinal direction of the flexible part based on the same reason as described above.

When the sacrificial layer surrounds the center portion of the substrate and extends outward from the outer periphery of the center portion of the substrate, it is also preferable that the third space is formed by etching the epitaxial layer excluding portions of the epitaxial layer to be left as the flexible parts and frame so that the sacrificial layer is exposed at the bottom of the third space and the sacrificial layer is subsequently removed using etching through the third space.

The third space may be formed by subjecting the eptaxial layer directly to the anisotropic etching or the RIE, or forming a second high impurity concentration layer in the eptaxial layer (it is noted that the first high impurity concentration layer is the sacrificial layer formed in the substrate) followed by removing the second high impurity concentration layer using etching. The manner with which the third space is formed depends on the shape and size of the third space to be formed. The third space, particularly a portion which reaches (or connected with) the sacrificial layer becomes an etchant introduction port (or opening). Particularly, when the etchant introduction port is formed using the RIE, the flexible parts can be precisely formed.

In the case in which the third space is formed, the anisotropic etching conditions are preferably so selected that the opening of the third space in the epitaxial layer which opening is remote from the substrate automatically stops the etching when the etching has proceeded up to the sacrificial layer. Such selection may be carried out by controlling the size and shape of the opening of a mask upon the anisotropic etching based on the anisotropic etching properties.

In a preferred embodiment, a cross section along the epitaxial layer of the third space, namely the shape of the etchant introduction port is circular, oval, rectangular (especially having four rounded corners) or any combination thereof. Particularly, there is an advantage that mechanical strength against the stress concentration is improved without a sharp corner.

In the method according to the present invention, when the second high impurity concentration layer is formed and then removed by etching, etching of the first high impurity concentration layer as the sacrificial layer can be carried out subsequently to the etching of the second high impurity concentration layer, so that the production sequence may be shortened.

In the present invention, the (first) high impurity concentration layer containing the impurity of the second conductivity type is formed as the sacrificial layer on the first main surface of the semiconductor silicon substrate of the first conductivity type, an impurity concentration of the high impurity concentration layer is preferably lower in the surface than in the inside thereof (or an inner side from the surface of the high impurity concentration layer). That is, a concentration profile of the impurity along a thickness of the high impurity concentration layer has a peak (maximum) at a certain position remote inward from the surface. In this manner, upon the initiation of the eptaxial growth on the substrate having the high impurity concentration layer, an amount of the impurity which escapes from the high impurity concentration layer into a growth atmosphere can be lowered. As a result, formation of an inversion layer due to auto-doping as well as diffusion of the impurity into the epitaxial layer to be formed are suppressed. In a preferable embodiment, the impurity concentration in the surface of the high impurity concentration layer is not more than $5\times10^{19}$ cm$^{-3}$ and not less than $1.0\times10^{17}$ cm$^{-3}$.

Such a high impurity concentration layer may be formed by the deposition and the thermal diffusion of the impurity into the substrate followed by the wet etching or the pyrogenic oxidation. Alternatively, the impurity concentration in the surface may be lower relative to that of the inside of the impurity layer by the direct implantation of an impurity ion into the substrate followed by annealing. In a further alternative, the impurity layer is formed beforehand and then another impurity having a conductivity type opposite to that of the impurity of the impurity layer is doped near the surface of the impurity layer so that the impurity concentration in the surface portion is made relatively smaller than that of the inner portion.

Upon the formation of the sacrificial layer on the substrate, when the impurity concentration of the first conductivity type of at least the epitaxial layer selected from the epitaxial layer and the substrate is larger than the concentration of the second impurity for the impurity layer which can be taken into the epitaxial layer by auto-doping upon the epitaxial growth, the N-type impurity and the P-type impurity are compensated with each other, whereby the inversion of the conductivity type of the substrate is prevented.

In one preferable embodiment of the present invention, the cross section of the first space which is taken through the center of the substrate and perpendicular to the substrate is so tapered in two step along a direction from the weight bottom to the neck part (i.e. an upward direction with respect to the substrate) that a distance between the support member and the weight is decreased, so that the first space is constituted by a first part near the weight bottom and a second part, and a tapering angle of the first part is smaller than that of the second part. That is, the gap between the inward side surface of the support member and the side surface of the weight becomes smaller when being closer to the eptaxial layer. The element as described is produced upon the formation of the first space by forming the first part using mechanically or chemically grinding, and then forming the second part using the anisotropic etching.

As described above, in one preferable embodiment of the present invention, before the etching, for example before the etching to remove the sacrificial layer, the wiring protection layer is formed so as to cover the piezoresistors (or the electrode for the electrostatic capacitance measurement) provided on the epitaxial layer, the wiring connected thereto, and another wiring and the electrode pad if any, and then the sacrificial layer is removed, and then that portion of the wiring protection layer which is on at least the electrode pad is removed with etching so as to expose the electrode pad. Since the sacrificial layer is removed with etching after the wiring protection layer is formed, it is prevented that the piezoresistors (or the electrode for the electrostatic capacitance measurement), the wiring and the electrode pad are corroded or broken because of the etchant for the removal of the sacrificial layer through etching, which improves a yield as well as reliabilities of the chip.

The wiring protection layer may be a chromium film, silicon nitride film or a fluoroplastic (including its composition). The wiring protection layer of the silicon nitride film may be formed by for example the plasma CVD method. When the silicon nitride film is used as the protection layer, it is preferably formed at a low temperature such as not higher than 300° C. since aluminum generally used for the wiring may cause an alloy spike problem at a temperature above 500° C.

When the fluroplastic is used as the wiring protection layer, it is convenient in that the fluoroplastic does substantially not disappear upon the removal of the sacrificial layer. Concretely, the fluoroplastic resin such as CYTOP CTL-809M (a composition of a fluoroplastic $(C_6F_{10}O)_n$ and tris(perfluorobutyl)amine from Asahi Chemical) may be used. The wiring protection layer may be formed by the sputtering or the vapor deposition in the case of the chromium film, and by dissolving the resin into a proper solvent followed by the spin coating in the case of the fluoroplastic resin.

When the wiring protection layer has been formed, it is possible to pattern-etch only a portion of the wiring protection layer which is on the electrode pad so as to thin only the portion by a desired thickness, and then the only electrode pad is exposed by etching the wiring protection layer over its entire surface after the removal of the sacrificial layer with etching. In this case, the wiring protection layer covers all except the electrode pad, so that moisture resistance of the sensor is improved. After the removal of the sacrificial layer with etching, the wiring protection layer has irregularities on its surface and substrate strength is reduced, so that carrying out patterning (for example photolithography step) becomes difficult. However, only the portion of the wiring protection layer on the electrode pad is thinned beforehand, etching over the entire surface after the etching removal of the sacrificial layer exposes only the electrode pad without patterning.

In the embodiment wherein the wiring protection layer is formed, the following is possible: etching to form the first space is stopped before it reaches the sacrificial layer so that a thin portion of the semiconductor substrate is left below the sacrificial layer, then an etchant introduction port as the third space which reaches the sacrificial layer is formed through the wiring protection layer and the epitaxial layer, then an etchant is supplied through the etchant introduction port so that the sacrificial layer is removed, and then said thin portion is removed through etching. In this embodiment, upon the removal of the sacrificial layer, the substrate is unlikely to be broken. The removal of the thin substrate portion may be carried out by anisotropic etching using an alkaline based etchant or the RIE.

It is noted that it may be advantageous to etch the bottom of the weight so that the weight has a thinned thickness. This is because the bottom cover having a flat form (i.e. without the recess part) may be used. Such etching may be carried out simultaneously with the etching to remove the semiconductor substrate portion left below the sacrificial layer.

Various embodiments of the present invention will be hereinafter explained more concretely with reference to the accompanied drawings, which do not limit the present invention.

First, one embodiment of the method of the present invention will be explained more concretely with reference to FIGS. 1 to 4.

Figure 2:
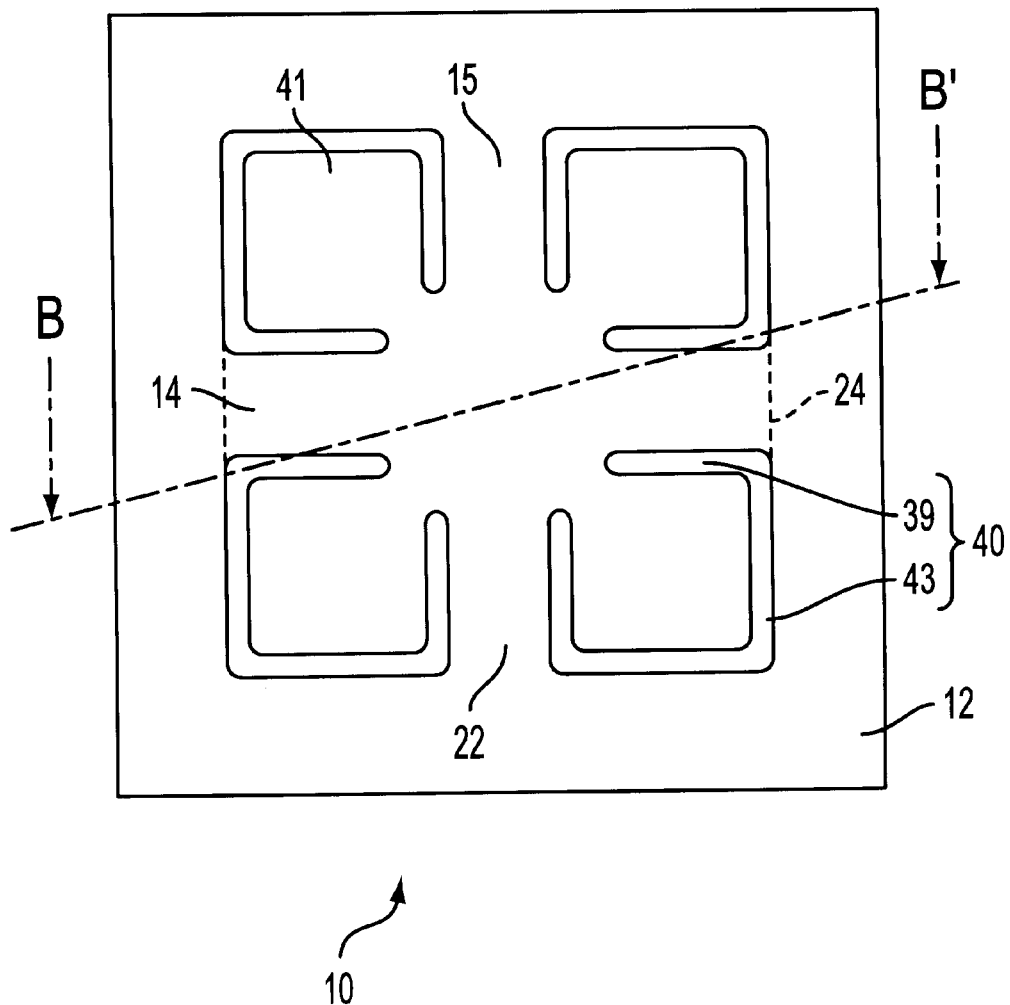
FIG. 2 shows a top view of the element of FIG. 1.

One example of the flexure transducer element (for the piezoresister-type acceleration sensor) of the present invention which is produced by the method according to the present invention is shown in a partially cut-away perspective view in FIG. 1 and in a top view (when seeing the element of FIG. 1 from the above) in FIG. 2.

The flexure transducer element of the present invention 10 comprises the frame 12 and the sheet member 14. The frame 12 includes the upper surface 16 and the lower surface 18, and the lower surface 18 is supported by the support member 20. The sheet member 14 is substantially composed of the flexible parts 15, the center part 22 and the weight upper part 41, and the flexible part 15 extends outward from the center part 22 and integrally connected to the inner edge 24 (shown with the broken line in FIG. 1) of the frame 12. The center part 22 of the sheet member 14 includes the weight body 26 below it, and the weight body 26 is connected integrally to the center part 22 through the neck part 28 (see FIG. 3(i)). In the shown embodiment, the weight body 26 includes the weight upper part 41 thereon, and these together substantially constitute the weight 26' of the element.

The inward side surface 30 of the support member 20 opposes to the outward side surface 34 of the weight 26 through the first space (or gap) 36. Further, the second space (or gap) 38 is located between the flexible parts 15 and the weight body 26, and the space is connected to the first space. In addition, the space 39 is located between the weight upper part 41 and the flexible part 15, the space 43 is located between the frame 12 and the weight upper part 41, and these spaces constitute the third space (or gap) 40. The sheet member 14, particularly the flexible part 15 includes on its surface, a plurality of the piezoresistors 42 (not shown in FIG. 2) and wires which are connected to the piezoresistors (not shown). It is noted that the space 43 and the first space 36 are connected to each other so as to constitute a slit form, and the second space 38 is connected to the first space 36 and the third space 40 and thus these spaces form a single space.

FIG. 3 shows a sequence of the production method of the element 10 shown in FIGS. 1 and 2 in cross sectional views taken along the line B–B'.

Figure 3A:
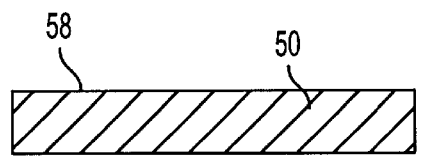
FIGS. 3(*a*) to (*i*) show in cross sectional views, a series of production steps of an element according to the present invention.

FIG. 3(a): First, a single crystal silicon substrate 50 is prepared as the semiconductor substrate of which conductivity type is N. When the element (having a size of for example 5 mm×5 mm) is produced, a plurality of the elements (for example 200–300 elements) are actually produced which are integrally adjacent to one another (in such a manner that the elements are arranged one on the other and one next to the other when seeing the substrate from its above) using a circular substrate (having a diameter of for example four inches) followed by cutting and dividing them into each single element using a dicing saw, which is generally carried out in the art of the semiconductor elements. Although the element and its production method of the present invention are explained with reference to the single element for ease of understanding, it is obvious for those skilled in the art that such explanations are applicable to the production of the plurality of the elements. Therefore, the substrate may be in a generally rectangular form or a square form in the sense of the production of the single element.

Figure 3B:
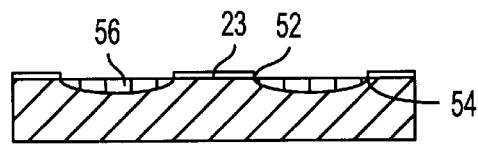

FIG. 3(b): Next, four sacrificial layers 56 each in the form of a substantially elongated rectangle are formed in the first main surface 58 of the substrate 50 which layers extend from the four sides 52 of the rectangular or square center part 23 of the silicon substrate 50 toward the outer periphery of the substrate, but terminate at the positions 54 before the periphery. The formation of the sacrificial layers is carried out by under the consideration that the flexible parts 15 are formed on the sacrificial layers, masking all of the first main surface except those portions on which the sacrificial layers are to be formed and then by ion implantation of a P-type impurity such as boron into the non-masked portions at a high impurity concentration followed by annealing, so that those portions are formed of which P-type impurity concentration is high. In this step, the sacrificial layer 56 preferably has a width which is a little wider than that of the flexible part 15.

Figure 3C:
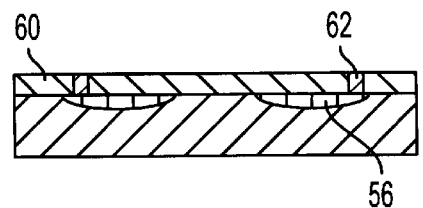

FIG. 3(c): Then, the eptaxial layer 60 of which conductivity type is N is formed on the whole of the main surface 58 of the substrate 50. Since the epitaxial layer 60 finally constitutes the sheet member 14 (and also the frame 12), it has such a thickness that the flexible part 15 is elastically flexed and deformed when an acceleration is applied. Thereafter, the P-type impurity is introduced (for example, the impurity such as boron is diffused) into those portions which corresponds to the third space, so that those portions 62 are formed which have the higher impurity concentration.

Figure 3D:
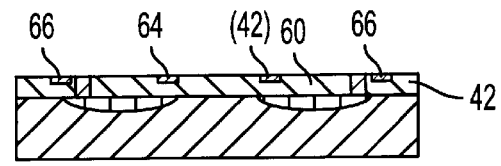

FIG. 3(d): Then, the pieziresistors 64 and 66 which transduce their resistance change due to the flexure into an electric signal are formed on portions of the epitaxial layer 60 which are formed into the flexible parts which can flex when the acceleration is applied. They are formed by diffusing into such portions, the P-type impurity such as boron of which conductivity type is opposite to that of the epitaxial layer 60. It is noted that the piezoresistor 66 may be used for offset or used as one of the piezoresitors which forms a bridge circuit.

Figure 3E:
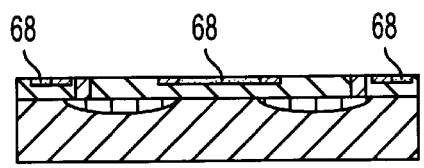

FIG. 3(e): Then, the wiring parts 68 which are electrically connected to the piezoresistors 64 and 66 are formed by the deposition and the thermal diffusion or the ion implantation and the annealing treatment.

Figure 3F:
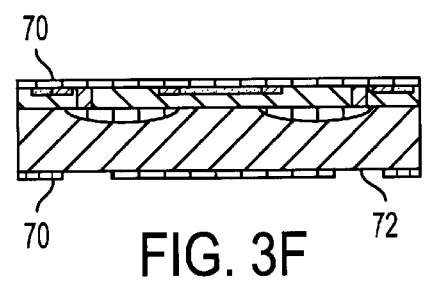

FIG. 3(f): Then, the exposed surface of the epitaxial layer 60 and the second main surface of the substrate are covered with silicon nitride films 70. Thereafter, the silicone nitride film is removed from that portion which corresponds to an opening 72 of the first space 36 in order to form the first space. It is preferable that silicon oxide films are formed beforehand the formation of the silicon nitride films 70.

Figure 3G:
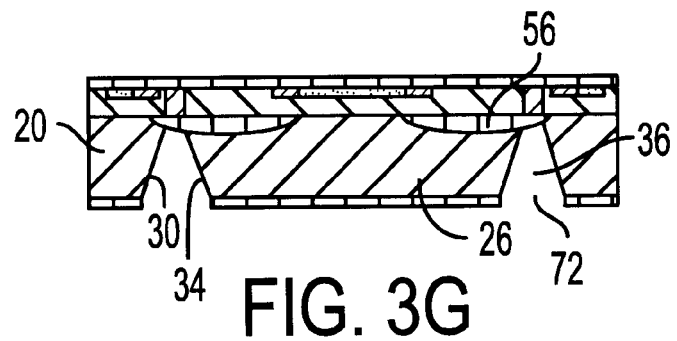

FIG. 3(g): Then, by using an alkaline solution such as a potassium hydroxide solution through the opening 72 on the second main surface of the silicon substrate 50, the silicon substrate 50 is partially removed by the anisotropic etching so that the first space 36 which leads to the sacrificial layer 56, the side surface 30 of the support member 20 and the side surface 34 of the weight 26 are formed. The anisotropic etching is such that an etching speed is faster along the thickness direction of the silicon substrate 50 and slower along a direction perpendicular to the thickness direction. Thus, since the sacrificial layer 56 extends perpendicular to the thickness direction of the silicon substrate 50, the etching stops while the sacrificial layer is hardly etched.

Figure 3H:
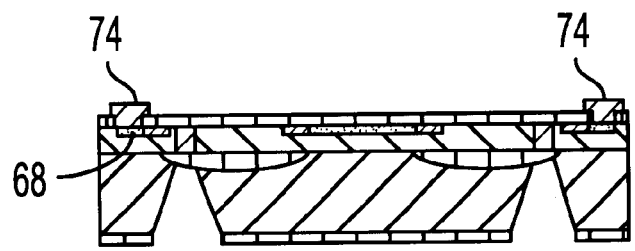

FIG. 3(h): Then, a portion of the silicon nitride film 70 on the first main surface is removed, and the electrode 74 is formed by the deposition or sputtering which is electrically connected to the piezoresistor 64 or 66 through the wiring part 68.

Figure 3I:
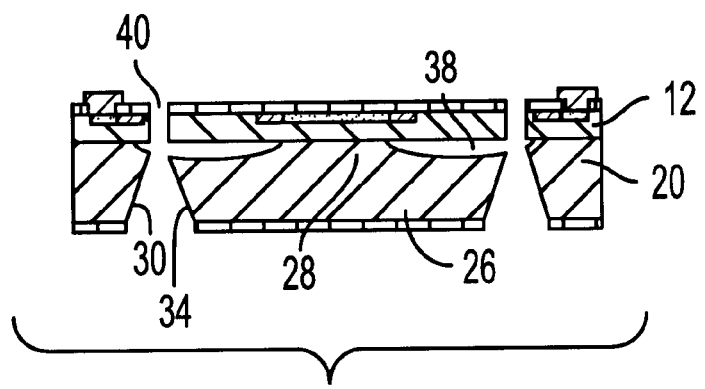

FIG. 3(i): Then, the sacrificial layer 56 is removed by the isotropic etching in which the etching proceeds to all directions and an etchant is supplied through the first space 36, so that the sheet member 14 is formed from the epitaxial layer 60 in which member the both edges are supported by the frame 12 of the epitaxial layer 60 and the weight 26 is hung from the center part 22 of the sheet member through the neck part 28.

In the etching in this step, an acidic solution containing hydrofluoric acid may be used. When such isotropic etching is carried out, the etching speed is faster in the sacrificial layer 56 in which the impurity concentration is high than in the epitaxial layer 60 in which he impurity concentration is low, and thus, only the sacrificial layer 56 is selectively removed, whereby the second space is provided. Finally, the portions 62 which have been so formed in the step of FIG. 3(c) that the impurity concentration thereof is high are removed by the isotropic etching subsequently to the removal of the sacrificial layer 56, so that the third space 40 is formed which is defined by the sheet member 14 and the frame 12. The third space 40 may be in the slit form composed of the spaces 39 and 43 as in the embodiment shown in FIG. 1.

It is noted that differently from the RIE (reactive ion etching), an edge portion includes a round corner when the isotropic etching is used, thus stress concentration is prevented at the edge when flexure is converged near the edge, and thus there is an advantage in that a semiconductor acceleration sensor is provided of which life time is extended. It is of course possible to form the third space 40 using the anisotropic etching which engraves along one direction or the RIE when the round portion is not required.

In the above method according to the present invention, since the anisotropic etching is used for the formation of the first space, the distance between the side surfaces of the support member and the weight can be made as small as possible, namely the first space can be made thin, and also the first space can be located as outward as possible with respect to the substrate, so that the volume of the weight can be larger when a substrate having a fixed size is used (thus, the weight can be heavier). Further, since the sacrificial layer is formed and then removed, the connection between the weight and the sheet member by the narrow neck part, and thereby the distance can be longer from the center of the flexible part to the frame when the substrate having a fixed size is used. Particularly, when the flexible part is substantially in the form of a beam as shown in FIG. 1, since in addition to the flexure concentration in the flexible part, the length of the flexible part can be longer, the sensitivity of the sensor is improved.

In the shown embodiment, that portion of the epitaxial layer except the center part 22 of the cruciform sheet member 14 and the weight upper part 41 includes no substrate below it and is made of only the eptaxial layer 60, and thus such a portion can substantially deform (or flex) when the acceleration is applied.

The operation of the semiconductor acceleration sensor shown in FIG. 1 will be explained. When an acceleration 1 applied to the frame 12, the weight 26' is displaced toward a direction which is opposite to the direction of the acceleration application, so that the flexible part 15 of the sheet member 14 flexes, whereby the piezoresistor 42 (or 64) formed in that part flexes and its resistance changes.

In this case, that portion of the sheet member 14 which is substantially elastically flexible is a both-end supported beam structure in which both ends are supported by the frame and the weight is connected to the center of the structure, and the weight is supported by the four beams (flexible parts 15). Therefore, the beams flex upon the acceleration application along any direction with respect to X, Y and Z axes which intersect with one another at a right angle, and the acceleration including the three axis components can be sensed.

The other piezoresistor 66 having the same structure as that of the piezoresistor 64 is formed on the top surface of the frame 12 as described above, and piezoresistors 64 and 66 are connected to each other so as to form a bridging circuit (not shown). By measuring a resistance of the piezoresistor 64 through the circuit, the acceleration is detected which is composed of the three axis components.

In the production method for the semiconductor acceleration sensor as described above, the side surface 34 of the weight 26 is formed by anisotropically etching the silicon substrate 50 from its second main surface, the sheet member 14 is formed by isotropically etching and removing the sacrificial layer 56 which is so formed that it partially surrounds the center part 22 of the silicon substrate 50, and such isotropic etching does not proceed as to the epitaxial layer 60 which is formed into the sheet member 14 because of the low impurity concentration of the eptaxial layer 60. Therefore, the thickness of the sheet member 14 is precisely controlled so that the acceleration sensor having the both-end supported beam structure is stably produced which has less sensitivity dispersion.

In addition, although in the shown embodiment, the actually elastically deformable portion is in the beam form, it may be wider and/or shorter when the sensitivity is not so important.

Further, the conductivity type of the substrate and the epitaxial layer 60 is an N-type in the above embodiment, it may be a P-type, in which case the piezoresistor 64 may be of an N-type.

Next, an embodiment will be explained in which the removal of the sacrificial layer with etching is carried out by etching and removing the sacrificial layer through the third space so as to form the second space. The formation of the third space may be carried out at any appropriate time, and for example, it may be before or after, or simultaneously with the formation of the first space.

Figure 4A:
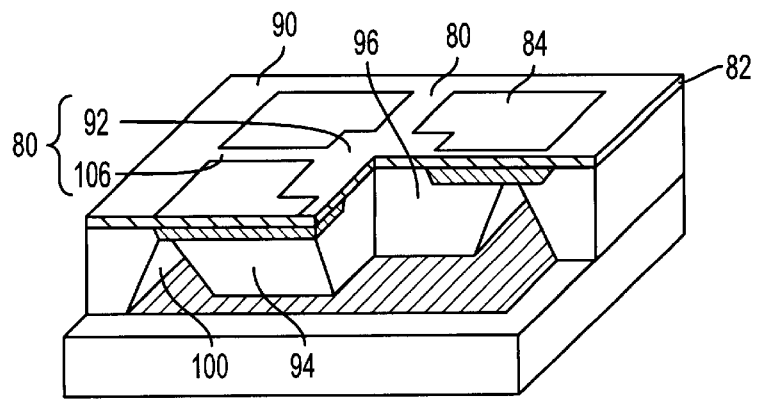
FIGS. 4(*a*) to (*c*) show in schematic partially cut-away perspective views, production steps of the element of FIG. 3.
Figure 4B:
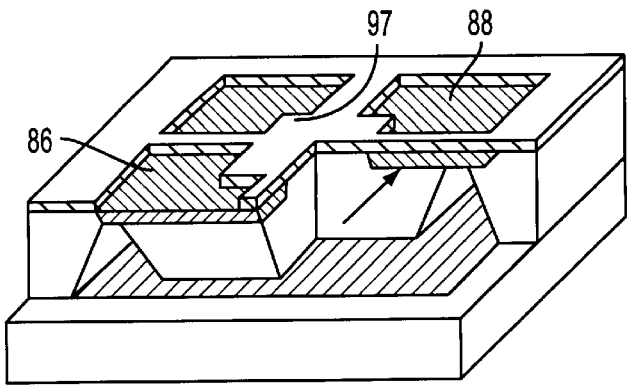
Figure 4C:
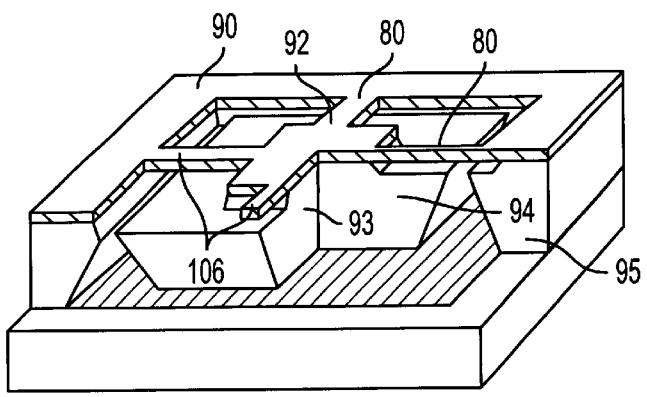

First, the predetermined sacrificial layer 88 and the epitaxial layer 82 are provided to the substrate 96 similarly to FIGS. 3(*a*) to (*c*). Then, as shown in FIG. 4(*a*), the epitaxial layer 82 is so masked that only the portion 84 of the epitaxial layer 82 excluding portions which are to be finally the sheet member 80 (including the center part 92 and the flexible parts 106) and the frame 90 is subjected to the etching, and then the portion 84 is removed by the RIE or the anisotropic etching so that the third space 86 is formed as an etchant introduction port and the sacrificial layer 88 is exposed at the bottom of the space 86, as shown in FIG. 4(*b*). Thereafter, the sacrificial layer 88 is removed by wet isotropic etching so that the sheet member 80 and the frame 90 are formed and also the weight 94 including the neck part 93 and the support member 95 are formed as shown in FIG. 4(*c*). In this way, when the etchant introduction port is formed in the portion of the epitaxial layer excluding the portions which is to be the sheet member and the frame, the sacrificial layer 88 as the high impurity concentration layer is directly etched, and also since the etching proceeds along the direction shown with the arrow of FIG. 4(*b*) below the elongated portion of the sheet member (i.e. the flexible part 106), the etching path is shortened, which results in the shorter etching removal period. In the absence of the etchant introduction port, the etching have to proceed along a direction which is perpendicular to the arrow and from the outer periphery of the weight 94 toward the neck part 93. It is noted that the embodiment shown in FIG. 4, the first space has been already formed.

In the embodiment shown in FIG. 4, the cross section of the third space 86 along the eptaxial layer 82 is of a substantially square except that a corner portion 97 near the center part 92 is inwardly convex. The cross section may be of any appropriate shape. Examples of the shape are schematically shown in the top views in FIGS. 5(*a*) to (*l*). Further additional examples are schematically shown in the partially cut-away perspective views in FIGS. 6(*a*) and (*b*).

For example, the etchant introduction port 86 (indicated with the slanted lines) is formed by etching and removing the epitaxial layer 82 except those portions which are to be the sheet member 80 and the frame 90, and then the etchant is supplied through the port 86 so as to etch and remove the sacrificial layer 86. Then, a residence phenomenon of the etchant is deleted so that the convection of the etchant proceeds fast, and thereby that effect is advantageously avoided which is based on the change of etchant composition due to the self-catalytic decomposition of nitric acid contained in the etchant in a locally confined space. Thus, the sheet member 80 is precisely formed without degrading the selectivity of the sacrificial layer 88 over the epitaxial layer 82. Further, as to the etching of the sacrificial layer 88 below the flex part 106, the etching can proceed along the direction (i.e. the direction of the arrow shown in FIG. 4(b) or FIG. 6(b)) which is perpendicular to the longitudinal direction 104 of the flexible part 106, the etching period can be shortened compared with the etching along the longitudinal direction 104 of the flexible part 106. It is noted that the etchant introduction port 86 is formed simultaneously with the formation of the first space 100 with the anisotropic etching, the introduction port 86 is produced without an additional step.

FIGS. 5(b) to (l) are schematic plane views of the sensors for the semiconductor acceleration sensor according to the present invention when seeing them from the above thereof, and show the shapes and the arrangements of the etchant introduction ports.

Figure 5A:
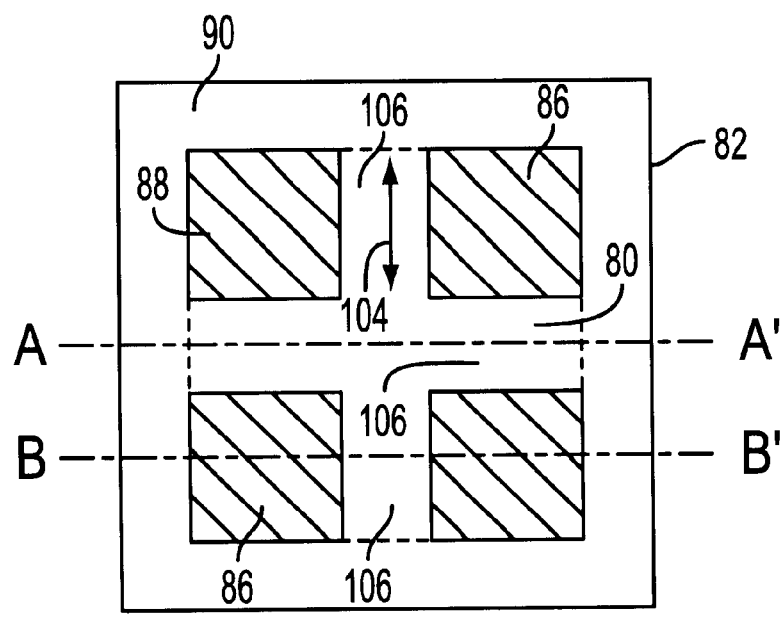
FIGS. 5(*a*) to (*l*) schematically show top views so as to show shapes and arrangements of an etchant introduction ports.
Figure 5B:
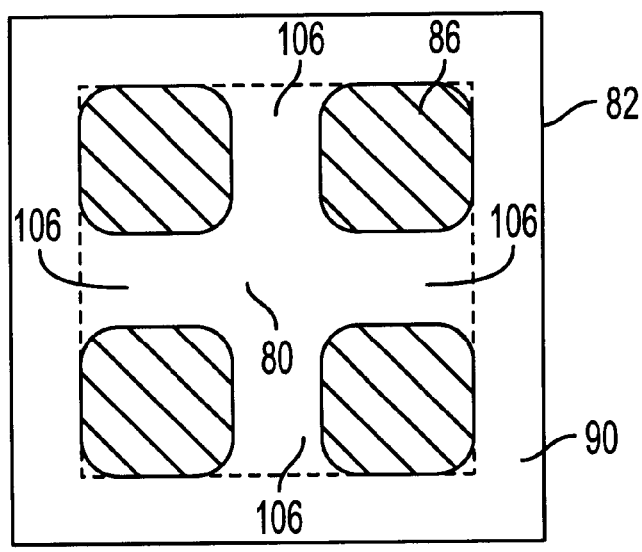

In FIG. 5(b), the corners of the shape of the etchant introduction port 86 shown in FIG. 5(a) when seeing it from the above are rounded, which improves the mechanical strength against the stress concentration of the flexible part 106 of the sheet member in the form of the beam at the end of the part 106 which reaches the frame 90.

Figure 5C:
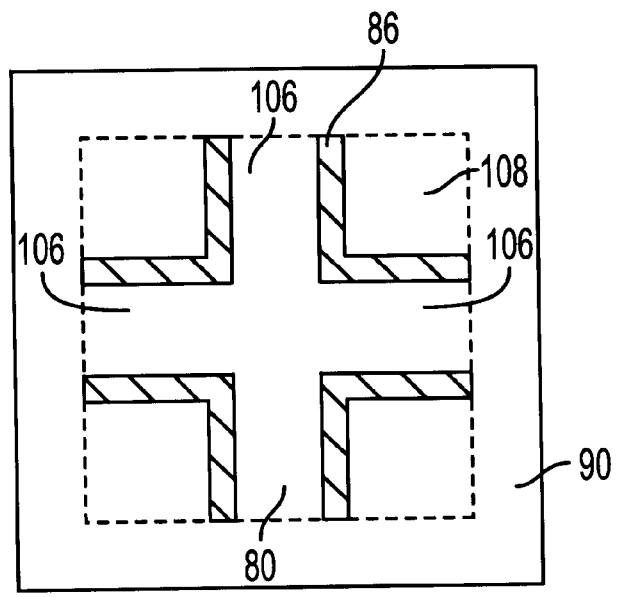

In FIG. 5(c), the etchant introduction ports as shown in FIG. 5(a) are formed in only those portions which are adjacent to the flexible parts 106. In this embodiment, the sacrificial layer 13 is etched and removed below and near the flexible parts 106, and the epitaxial portions 108 (which is enclosed by the etchant introduction port 86 and the frame 90) is not removed so that the substrate is left below the portions when the sacrificial layer is absent, whereby the sensitivity is improved because of the volume increase of the weight. It is noted that it is required to form slits at least partially inside the flexible parts 106 and between the portions 108 and the frame 90 using for example the RIE so that the flexible parts 106 have additional flexibility.

Figure 5D:
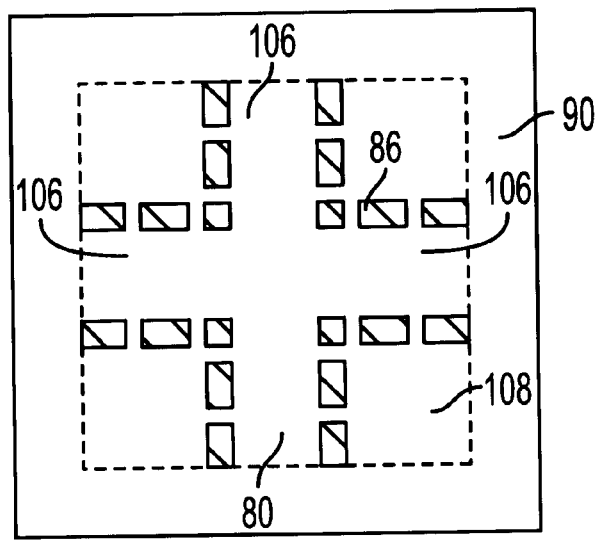
Figure 5E:
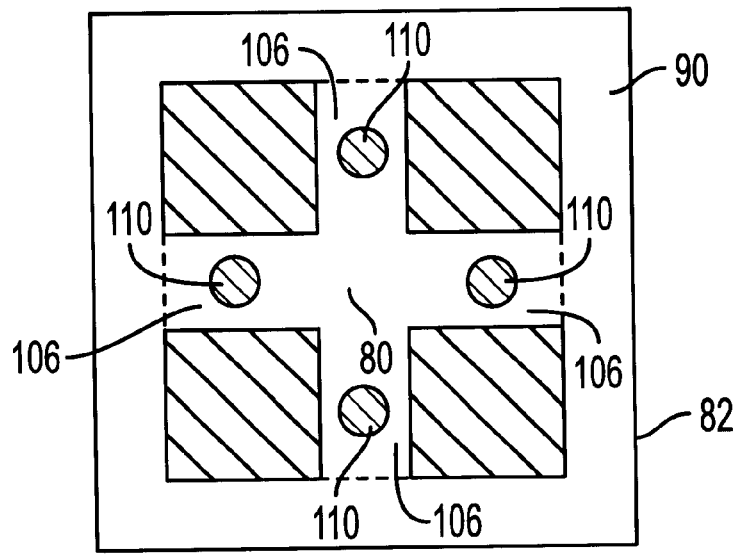
Figure 5F:
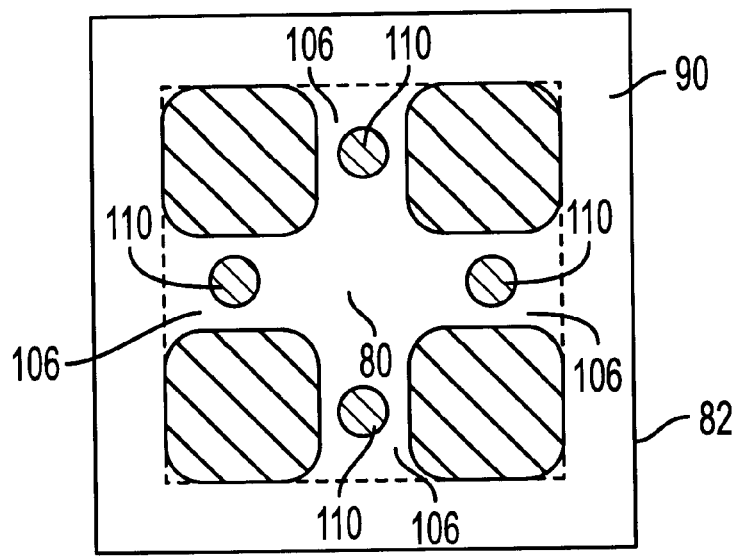
Figure 5G:
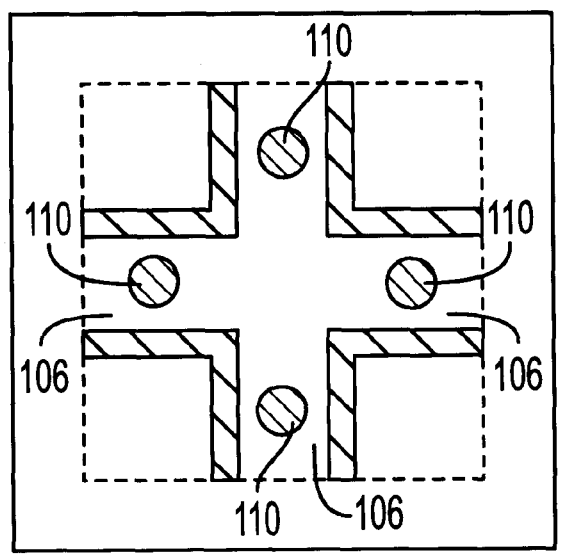
Figure 5H:
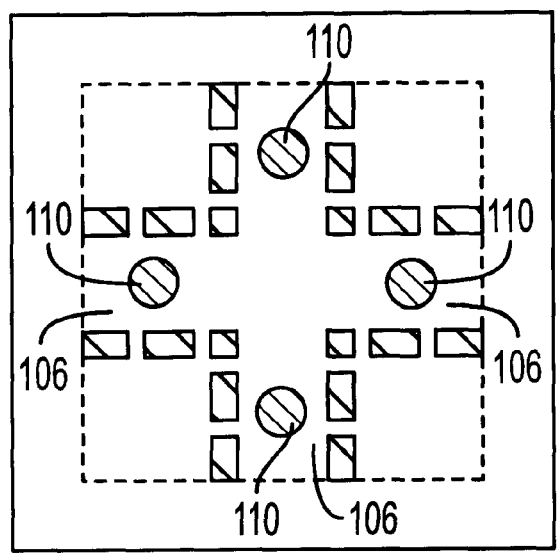
Figure 5I:
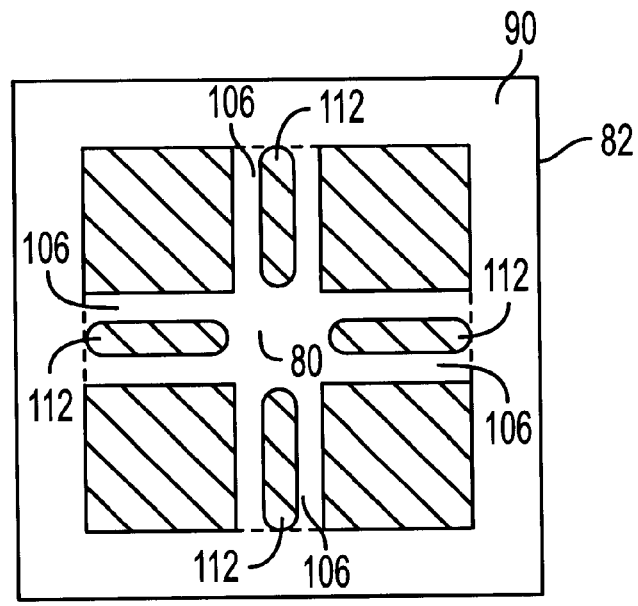
Figure 5J:
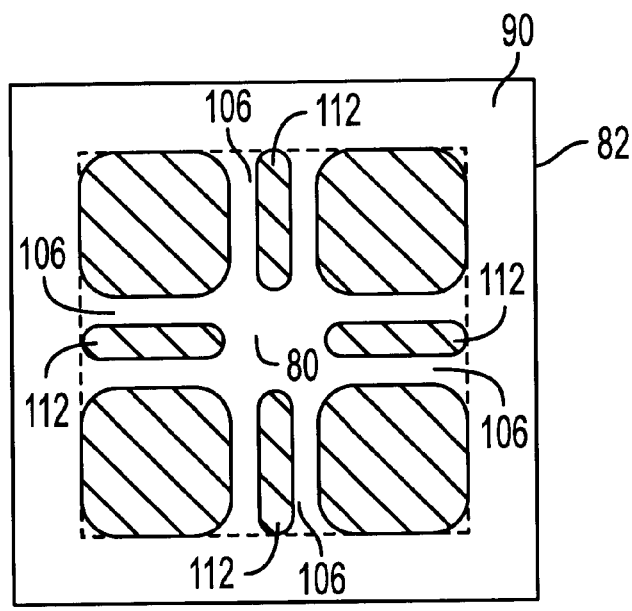
Figure 5K:
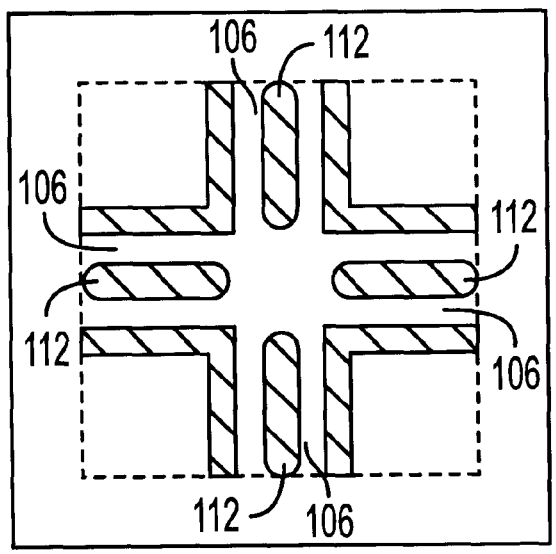
Figure 5L:
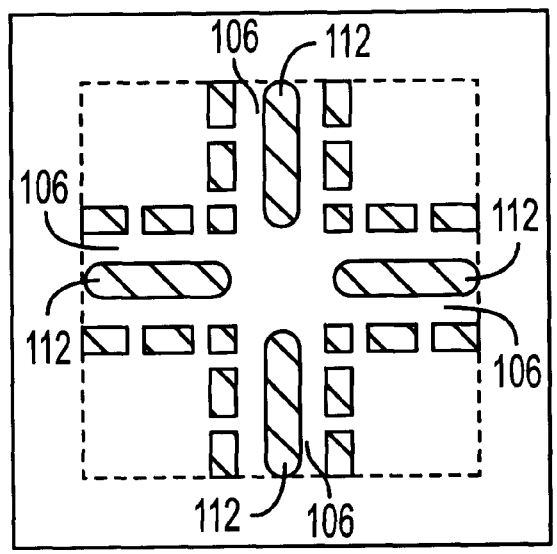

In FIG. 5(d), the etchant introduction ports 86 shown in FIG. 5(c) is divided into a plurality of the rectangular portions, and the similar effect to that in the embodiment of FIG. 5(c) is achieved. The flexible parts 106 are partially connected to the epitaxial layer portions 108 which are connected to the frame 90. When a wafer is rotated at a high speed upon coating with a resist, the flexure or breakage of the sheet member 80 because of for example the high viscosity of the resist is prevented, so that this embodiment is better in the mechanical strength as to the handling aspect (i.e. workability). As in the embodiment of FIG. 5(c), the slits are required to be formed in the flexible parts 106 so as to confer the additional flexibility. In the shown embodiment, a plurality of the rectangular etchant introduction ports 86 are formed. However, there is no specific limitation to this, and for example the etchant introduction port may be an oval shape.

FIGS. 5(e) to (h) correspond to the embodiments of FIGS. 5(a) to (d) respectively in which the etchant introduction ports 110 are further formed inside the flexible parts 106, and thereby the sacrificial layer 88 is etched from the center portions and the sides of the flexible parts 106 so that the etching period is shortened. The shape of the etchant introduction port when seeing it from the above may be any shape such as a circle, oval, rectangle, square, square having round corners and so on, but the circle, the oval and the square having the round corners are preferable when the stress concentration around the etchant introduction port is considered. A plurality of the etchant introduction ports 110 may be present along a centerline of the flexible part 106 which is parallel to the longitudinal direction of the flexible part. It is noted that the above descriptions as to FIG. 5(a) to (d) are also applicable to FIG. 5(e) to (h) respectively when they are appropriate.

FIGS. 5(i) to (l) correspond to the embodiments of FIGS. 5(a) to (d) respectively in which the etchant introduction ports 112 are further formed along the substantially an entire length of the flexible parts 106, and thereby the sacrificial layer 88 is etched from the center portion and the sides of the flexible part 106 along a direction perpendicular to the longitudinal length of the flexible part 106 so that the etching period is shortened. The shape of the etchant introduction port 112 when seeing it from the above may be any shape such as an oval, rectangle, square, rectangular having four round corners and so on, but the oval and the rectangular having the four round corners are preferable when the stress concentration around the etchant introduction port is considered. It is noted that the above descriptions as to FIG. 5(a) to (d) are also applicable to FIG. 5(i) to (l) respectively when they are appropriate.

Figure 6A:
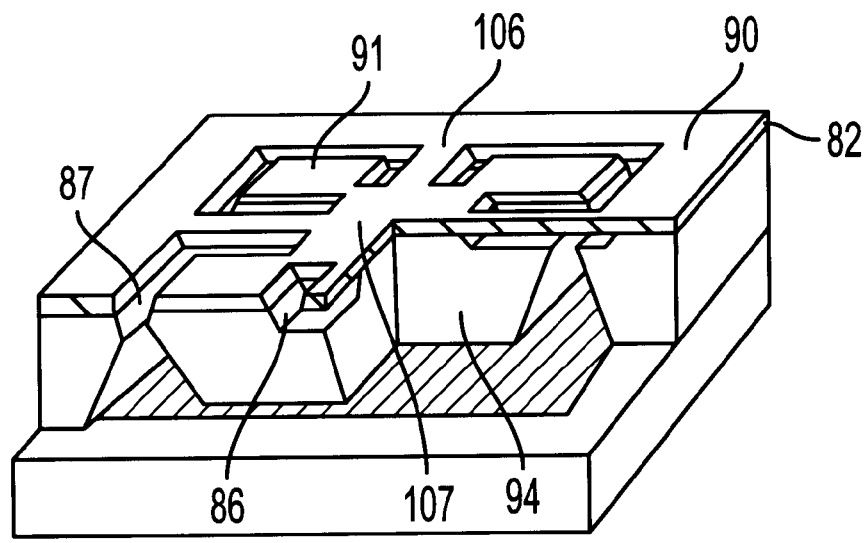
FIGS. 6(*a*) and (*b*) show schematic partially cut-away perspective views of other embodiment of an element according to the present invention.
Figure 6B:
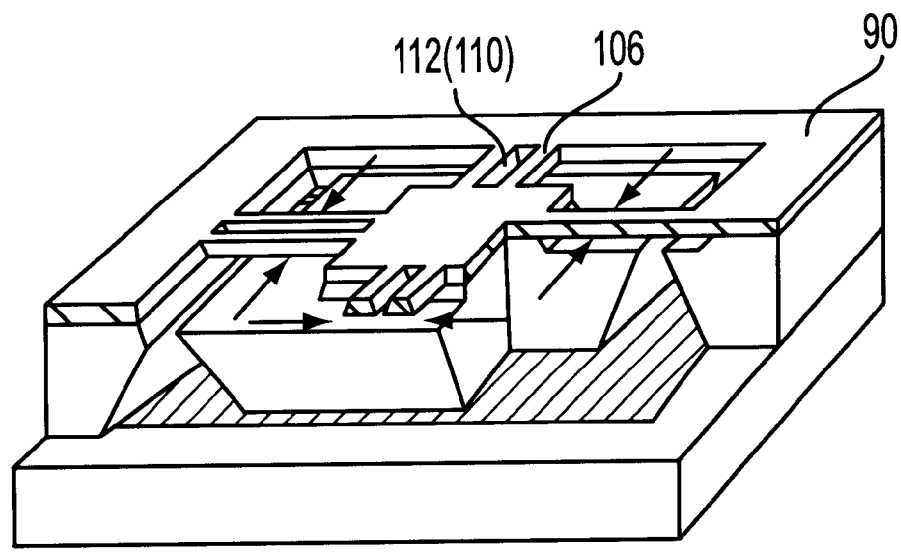

In the embodiments shown in FIG. 5(a), FIG. 5(b), FIG. 5(e), FIG. 5(f), FIG. 5(i) and FIG. 5(j), the epitaxial layer 82 is removed by etching except the sheet member 80 and the frame 90 as in the embodiment shown in FIG. 6(b). However, in the embodiments shown in FIG. 5(c), FIG.(d), FIG. 5(g), FIG. 5(h), FIG. 5(k) and FIG. 5(l), the epitaxial layer 82 may be etched in only those portions which are adjacent to the frame 90 so that the slit 87 is formed which connected to the first space and the third space, as shown in FIG. 6(a), so that the weight 94 is made heavier and thereby the sensitivity is improved. The flexible parts 106 of the embodiments shown in FIGS. 5(e) to (l) correspond to the flexible parts 106 of FIG. 6(a) in which the etchant introduction ports 110 or 112 are further formed.

In the embodiments shown in FIG. 5(c), FIG. 5(d), FIG. 5(g), FIG. 5(h), FIG. 5(k) and FIG. 5(l), if a size of the etchant introduction port 86 (especially the size of the portion 84) is so designed under the consideration of the anisotropic etching properties that the etching automatically stops when the sacrificial layer 86 is reached, excessively-etching of the weight 94 is prevented, which otherwise would reduce the sensitivity. Such designing can be carried out by controlling an opening size of the mask for the anistropic etching.

In the embodiments shown in FIGS. 5 and 6, although the weight is carried by the four flexible parts 106 in the form of the beams (see FIG. 6(a)) or the eight flexible parts 106 in the form of the beams (see FIG. 6(b)), the number of the beams is not limited to such embodiments. Any number (for example, twelve beams and sixteen beams) of the beams may be employed to carry the weight.

In the embodiment shown in FIG. 6(a), the eptaxial layer 82 forms the sheet member 80 including the flexible parts 106, the center part 107 and weight upper parts 91, while the embodiment shown in FIG. 6(b) has no weight upper parts.

The formation of the third space by providing the second high impurity concentration layer in the epitaxial layer will be explained with reference to FIG. 7.

FIG. 7 schematically shows in the cross sectional views, the steps for the production of the transducer element for the semiconductor acceleration sensor according to the present invention, and FIG. 8 schematically shows in the partially cut-away perspective views, some stages during the steps of FIGS. 7(b) to (i).

Figure 7A:
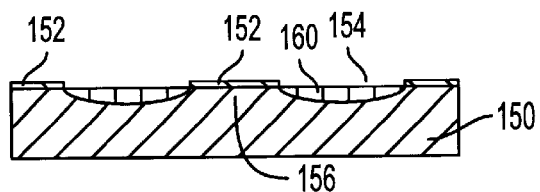
FIGS. 7(*a*) to (*i*) show in cross sectional views, a series of production steps of another element according to the present invention.

FIG. 7(a): On the single crystal silicon substrate 150 as an N-type semiconductor substrate having a thickness of for example 400 to 600 µm and an orientation of crystal plane (crystal orientation) of (100) is provided a silicon oxide film 152 by for example the thermal oxidation, and then the openings 154 are formed by etching the silicon oxide film 152 through a mask of a photoresist (not shown) having a predetermined pattern followed by the removal of the photoresist through for example the plasma ashing. The openings 154 are formed on those portions which extend outward from four sides surrounding the generally rectangular center part 156 (thus, the portions are elongated ones which partly surround the center part), and on which the flexible parts (concretely, the beam parts) are to be formed, and also on vicinities along longitudinal directions of those portions. Thus, the width of the flexible part 158 is smaller than that of the opening 154.

The opening 154 is not limited to the shown embodiment, and it may be formed in that portion which entirely surrounds the center part 156 of the single crystal silicon substrate 150 (i.e. that portion is annular).

Then, using the silicon oxide film 152 having the openings 154 as the mask, the sacrificial layers 160 are formed as high impurity concentration layers in which the P-type impurity such as boron (B) is present at a high concentration by the deposition and the thermal diffusion or the ion implantation and the annealing treatment of the P-type impurity. The concentration of the P-type impurity in the sacrificial layer 160 is desirably for example not less than $1.0 \times 10^{17}$ cm$^{-3}$ and below its solid solubility (limit).

Figure 7B:
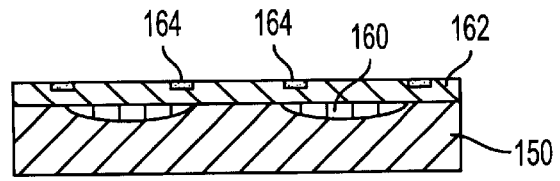

FIG. 7(b): Then, the silicon oxide film 152 is removed by etching. Thereafter, on the side where the P-type sacrificial layer 160 of the single crystal silicon substrate 150 is formed is formed the eptaxial layer 162 which has such a thickness that the flexible part 158 to be formed can elastically flex when the acceleration is applied, and then the piezoresistors 164 are formed in the predetermined portions of the corresponding flexible parts 158 of the epitaxial layer 162 using a resist having the predetermined pattern as a mask and also using the deposition and the thermal diffusion or the ion implantation and the annealing treatment of the P-type impurity such as boron (B) (see FIG. 8(a)).

Figure 7C:
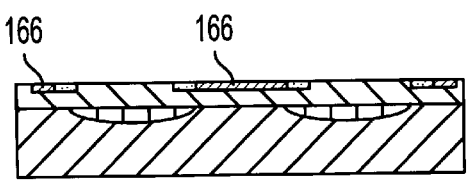

FIG. 7(c): Similarly, the diffusion wirings 166 are formed which are electrically connected to the piezoresistors 164 by the deposition and the thermal diffusion or the ion implantation and the annealing treatment of the P-type impurity, and then the photoresist is removed.

Figure 7D:
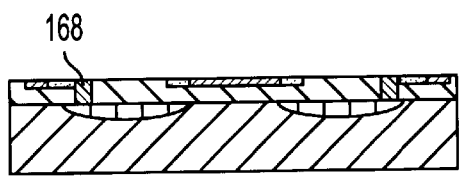

FIG. 7(d): Then, the P-type impurity layers 168 which reach the buried P-type impurity layer 162 are formed adjacently to those portions which are to be the sheet member of the epitaxial layer 162, especially the flexible parts 158 by the deposition and the thermal diffusion or the ion implantation and the annealing treatment of the P-type impurity, and then the photoresist is removed (see FIG. 8(b)).

In this embodiment, the impurity layers 168 are formed adjacently to the flexible parts 158, to which the embodiment is not limited. The impurity layers of the epitaxial layer may be so formed that they are connected to the sacrificial layer 160 excluding the flexible parts 158, the center part 188 and frame 186. Further, in this embodiment, although the impurity layers 168 are formed after the piezoresistors 164 and the diffusion wirings 166 have been formed, the piezoresistors 164 and the diffusion wirings 166 may be formed after the impurity layers 168 have been formed.

Figure 7E:
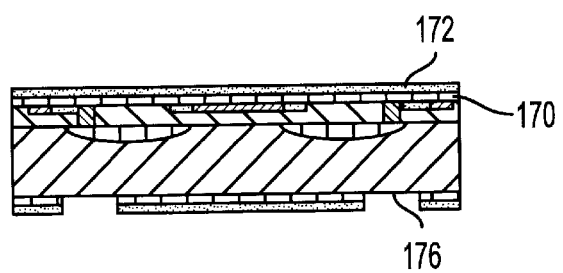

FIG. 7(e): Then, on the single crystal silicon substrate 150 and the epitaxial layer 162 are formed the silicon oxide films 170, on which protection films 172 such as silicon nitride films are formed. These two kinds of films are advantageous in that their camber directions are opposite to each other, which serves to keep the flatness of the substrate. Thereafter, the openings 176 are formed in predetermined portions which correspond to the outer periphery of the weight 174 described below by etching the silicon oxide film 170 and the protection film 172 thereon using the photoresist (not shown) as a mask having the predetermined pattern, and then the resist is removed.

Figure 7F:
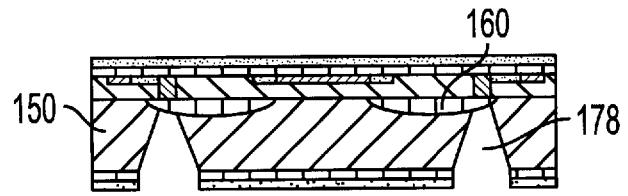

FIG. 7(f): Then, the silicon substrate 150 is anisotropically etched with an alkaline etchant solution (such as a KOH solution) using as a mask the protection film 172 having the openings 176, so that the first space 178 reaching the buried P-type sacrificial layer 160 is formed.

Figure 7G:
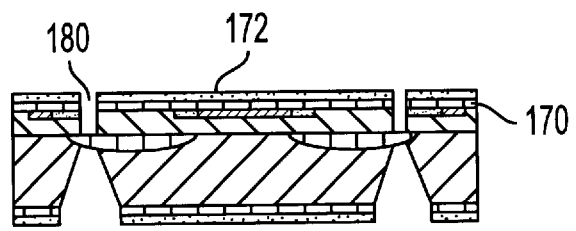

FIG. 7(g): Then, portions of the silicon oxide film 170 and the protective film 172 on the P-type impurity layers 168 are removed by etching so as to provide openings (not shown) which are used for the formation of the third space, and through which an etchant based on hydrofluoric acid/nitric acid is supplied to form the etchant introduction ports 180 as the third space.

Figure 7H:
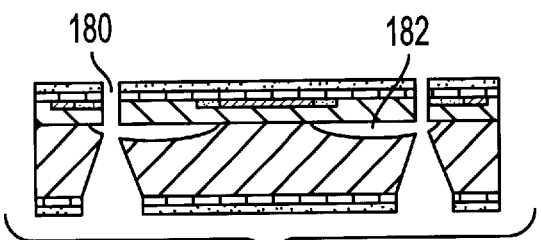

FIG. 7(h): Then, through the etchant introduction ports 180 is supplied an etchant based on hydrofluoric acid/nitric acid so that the buried P-type sacrificial layers 160 are removed to form the second space 182 (see FIG. 8(c)). As the etchant based on hydrofluoric acid/nitric acid herein, an etchant containing hydrofluoric acid: nitric acid:acetic acid= 1:1 to 3:8 (50% hydrofluoric acid aqueous solution:69% nitric acid aqueous solution acetic acid, based on volume) may be used.

It is noted that the etching of the sacrificial layer 160 may be carried out through the first space 178 and the third space 180.

Figure 7I:
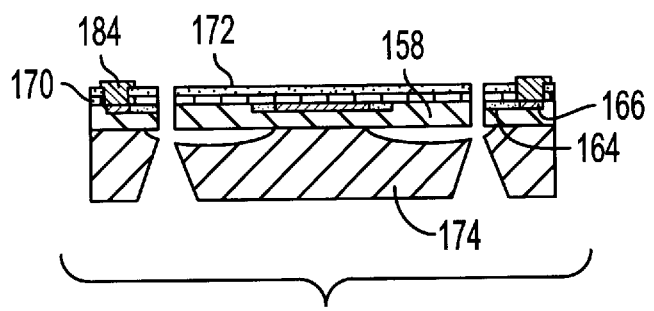

FIG. 7(i): Then, the predetermined portions of the silicon oxide film 170 and the protection film 172 thereon which portions are on the diffusion wirings 166 are removed by etching so as to provide contact holes which are filled, and then metal (such as aluminum) wirings 184 are so formed that they are electrically connected to the piezoresistors 164 through the diffusion wirings 166, and thereafter, the silicon oxide film 170 on the silicon substrate 150 and the protection film 172 thereon are removed by etching (see FIG. 8(d)).

Figure 8A:
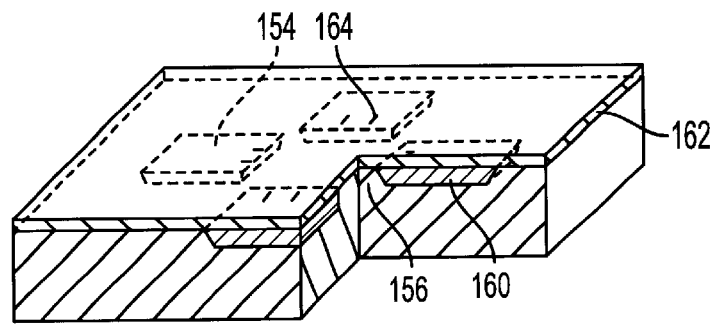
FIGS. 8(*a*) to (*e*) show in schematic partially cut-away perspective views, production steps of the element of FIG. 7.
Figure 8B:
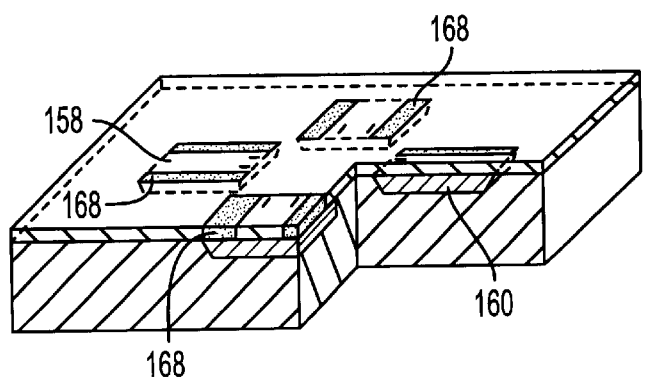
Figure 8C:
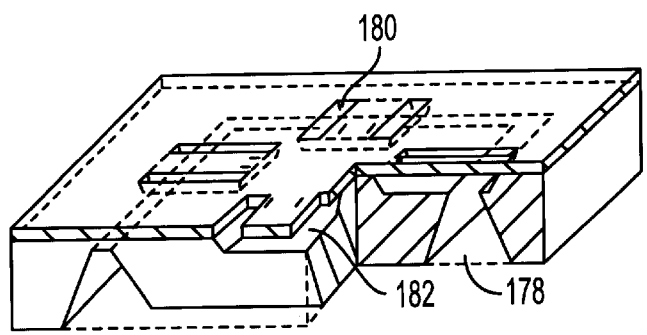
Figure 8D:
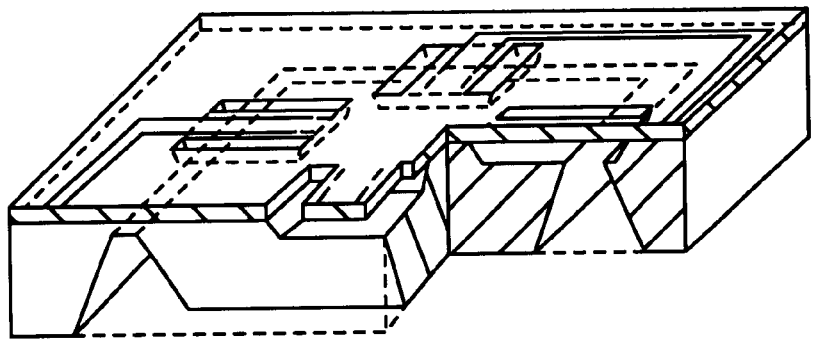
Figure 8E:
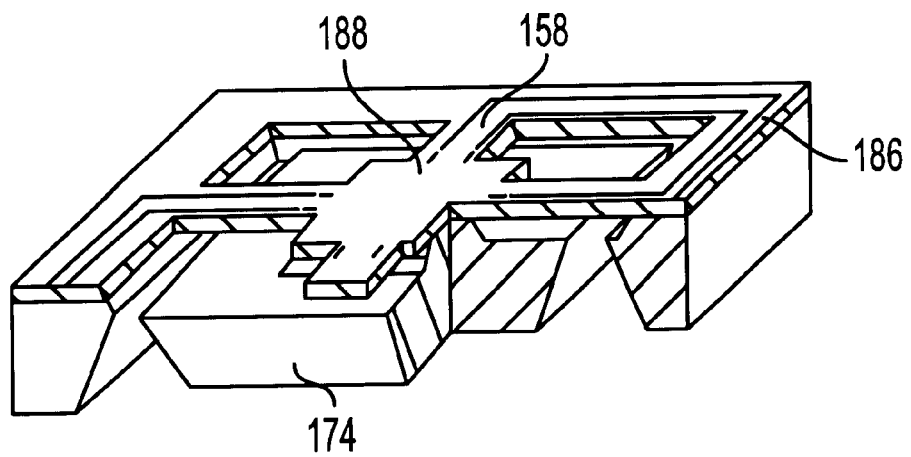

Finally, those portions of the epitaxial layer 162 which exclude portions to be the flexible parts 158, the center part 188 and the frame 186, and optionally a portion of the single crystal silicon substrate 150 below them are removed by the RIE (reactive ion etching), whereby the sheet member (158+188) of which all ends are supported by the frame, and the weight 174 is hung from the center part 188 is provided, resulting in the element according to the present invention (see FIG. 8(e)). In the element, the interfaces between the flexible parts 158 and the frame 186 as well as the interfaces between the flexible parts 158 and the center part 188 are preferably processed so as to have the edges with the rounded corners (or sides) so as to avoid the stress concentration.

In this embodiment, the etchant introduction ports 180 are formed in those portions which are adjacent to the flexible parts 158 of the epitaxial layer in the form of the beams, and the etchant is supplied such ports to remove the buried P-type sacrificial layer 160 by etching, so that the effect is avoided which is based on the change of the etchant composition due to the self-catalytic decomposition of nitric acid contained in the etchant in the locally confined space. Thus, the flexible parts 158 are precisely formed without degrading the selectivity of the buried P-type sacrificial layer 160 over the epitaxial layer 162.

Also, since the P-type impurity layer 168 is of the high impurity concentration as in the P-type impurity layer 160, the etching removals of the impurity layers 168 and 160 can be carried out successively, so that the step can be shortened.

Further, in this embodiment, since the etching can be carried out not along the longitudinal direction of the flexible part 158, but along a direction which is perpendicular to the longitudinal direction of the flexible part 158, the etching path can be shortened.

Next, an embodiment will be explained wherein the first space is composed of two parts.

Figure 9:
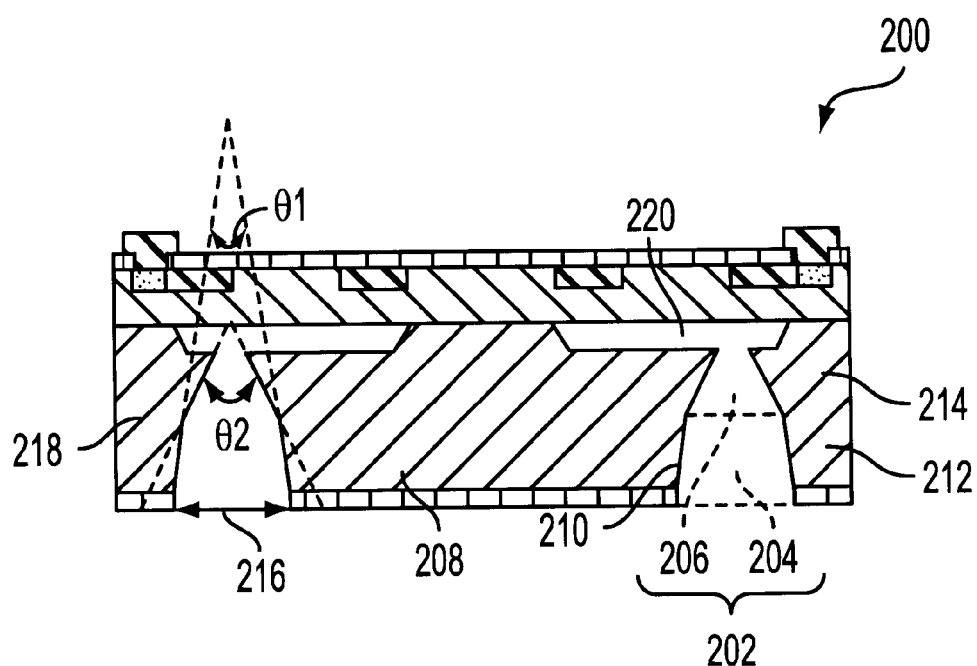
FIG. 9 shows a schematic cross sectional view of another embodiment of a first space.

FIG. 9 shows a schematic cross sectional view of one embodiment of the element 200 for the semiconductor acceleration sensor according to the present invention, and is substantially similar to for example the cross sectional view of FIG. 3(i) except that the shape (or form) of the first space 202 is different.

As easily seen from FIG. 9, the element 200 includes the first space 202 composed of the first part 204 which is formed by a mechanical or chemical process and the second part 206 which is formed by the anisotropic etching. Clearly from FIG. 9, the side surface 210 of the weight 208 and the side surface 214 of the support member 212 form such a taper that the angle ($\theta_1$) of the first part is smaller than the angle ($\theta_2$) of the second part, each angle being defined by the tow side surfaces.

Upon the formation of the first space 202, when the anisotropic etching is used from the beginning of the formation, the angle formed by the side surface of the weight and the support member is $\theta_2$, and the etching has to proceed up to such a depth that the sacrificial layer is reached. Thus, the opening 216 should be larger as shown with broken lines, so that there occurs a problem that the volume of the weight is decreased. Such a problem is overcome in this embodiment.

That is, in the element as shown, the volume of the weight can be increased without enlarging an area of the opening 216 for the first space. This means that the sensitivity of the acceleration sensor can be improved without enlarging the chip area of the sensor. It is noted that although in the shown embodiment, the first space is composed of the two parts, the first part may be ground mechanically or chemically so as to further divide it into a plurality of sub-parts provided that the tapering angle of the sub-part is smaller than the tapering angle of the second part ($\theta_2$)

Concretely, upon the formation of the first space as the above, the semiconductor substrate 218 is mechanically ground up to around its midpoint so as to form the first part 204. The shape of the opening of the first part 204, especially the distance between the both side surfaces should be such that a sufficient second part opening is ensured for the formation of the second part 206 in the next step.

As to the mechanically grinding for the formation of the first part, for example, using a dicing saw or collision of particles at a high speed (such a sandblast manner) may be used. The sandblast manner blows fine sand particles against an object at a high pressure and thereby a material is removed from the object. Alternatively, the first part may be formed using a chemical reaction, and for example, the reactive ion etching (RIE) may be used.

Then, the second part 206 is formed by the anisotropic etching using an alkaline solution such as a potassium hydroxide aqueous solution. The etching is carried out so that when the sacrificial layer is present in the second space 220, it proceeds up to the sacrificial layer which serves as an etching stop layer. When the sacrificial layer is not present, the etching is stopped when it reaches the second space 220. The first part 204 functions as a mask and an etchant introduction port for the formation of the second part 206. As the etchant, in addition to the potassium hydroxide aqueous solution, ethylenediamine pyrocatechol, hydrazine and so on may be used.

The mechanical grinding is advantageous in that the removal speed is larger compared with the etching so that a thicker substrate can be worked, which makes the volume (thus heft) of the weight larger. The reactive ion etching is one of the semiconductor processing techniques, and advantageous in that it is used in the same environment as used in other processing for the production of the element, and also that $\theta_0$ can be smaller relatively to the mechanical grinding (namely, grinding can be carried out at an angle which is closer to a right angle with respect to the substrate 218), so that the opening 216 is made smaller and $\theta_1$ can be substantially 0°.

The embodiment wherein the first space is made of the two parts will be explained in detail with reference to FIG. 10.

Figure 10A:
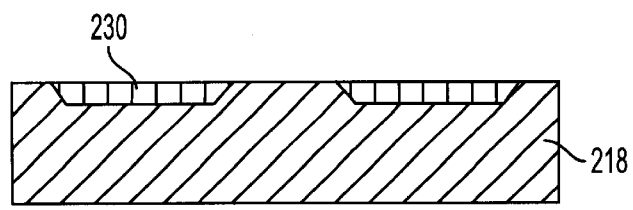
FIGS. 10(*a*) to (*h*) show in cross sectional views, a series of production steps of an element having the first space shown in FIG. 9.

FIG. 10(a): As the semiconductor substrate 218, an N-type substrate having an orientation of crystal plane of (100) is used. The semiconductor substrate 218 desirably has an impurity concentration of not more than $1.0 \times 10^{17}$ cm$^{-3}$. The thickness of the substrate is thicker a little (for example, a thickness of about 1000 $\mu$m) relatively to the conventionally used one.

First, in a diffusion step for the formation of the sacrificial layer 230, the deposition and the thermal diffusion or the ion implantation and the annealing treatment are carried out. The impurity such as boron is used herein and doped to a high concentration. The diffusion depth is controlled depending on the application. The sacrificial layer 230 may be an N-type high impurity concentration layer while using antimony, phosphorous and so on. The sacrificial layer 230 functions as an etching stop and the sacrificial layer itself in the present invention.

Figure 10B:
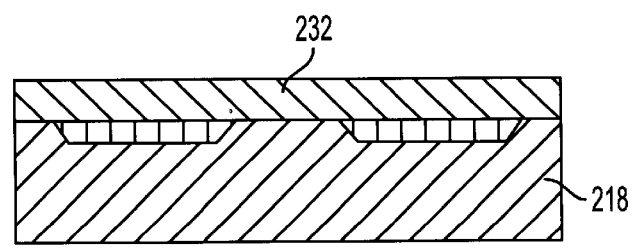

FIG. 10(b): The eptaxial layer 232 is formed on the substrate 218 through the epitaxial growth. The epitaxial layer 232 constitutes the frame and the sheet member of the flexure transducer element. Since the layer 232 is formed by the epitaxial growth, its thickness is controlled easily and precisely.

Figure 10C:
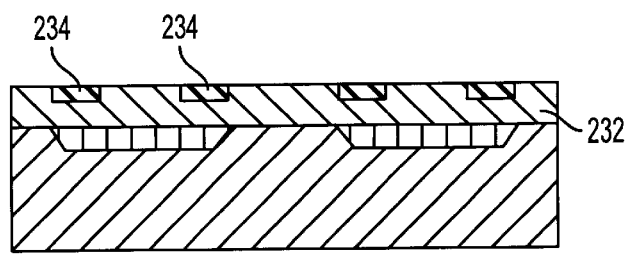

FIG. 10(c): Then, the piesoresistors 234 are formed in those portions of the epitaxial layer which are to become the flexible parts by the thermal diffusion or the ion implantation and the annealing treatment using the P-type impurity such as boron.

Figure 10D:
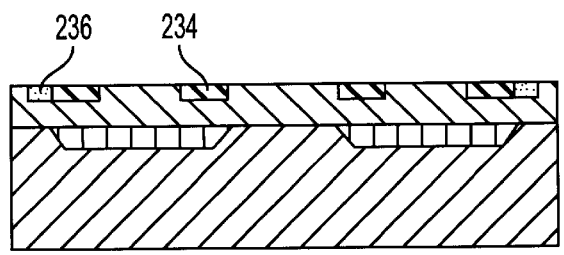

FIG. 10(d): Then, the diffusion wirings 236 which output the change of resistance of the piezoresistors 234 are formed in those portions of the epitaxial layer 232 which are to become the flexible parts by the deposition and the thermal diffusion or the ion implantation and the annealing treatment using the P-type impurity such as boron. The impurity concentration is larger than that in the piezoresistor formation step (FIG. 10(c)).

Figure 10E:
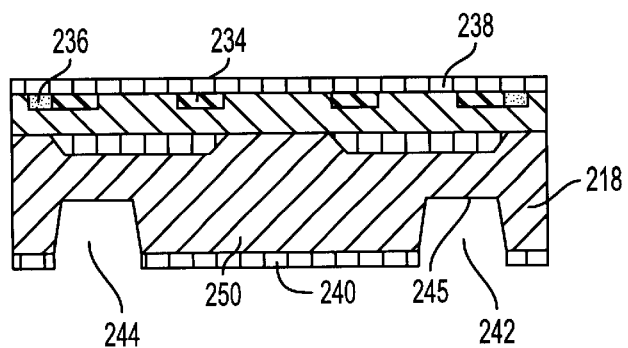

FIG. 10(e): Then, the protection mask 238 which protects the epitaxial layer 232, the piezoresistors 234 and the diffusion wirings 236 as well as the formation mask 240 which is used to form the weight 250 are formed. Both masks are preferably made of a silicon nitride film and/or a silicon oxide film. Subsequently, the first part 242 is formed by mechanically grinding the semiconductor substrate 218 for example up to around the midpoint thereof. As the mechanical grinding means, a dicing saw is herein used. The size of the opening 244 of the first part 242 is such that the necessary opening 245 is ensured for the next step for the production of the second part 246.

Figure 10F:
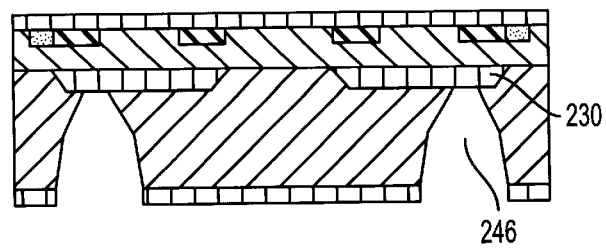

FIG. 10(f): Then, the second part 246 is formed by anistropically etching using the alkaline aqueous solution such as a potassium hydroxide. The etching is carried out up to the sacrificial layer 230 which functions as the etching stop layer. The first part 242 functions as an etching mask and an etching solution introduction port for the formation of the second part 246.

Figure 10G:
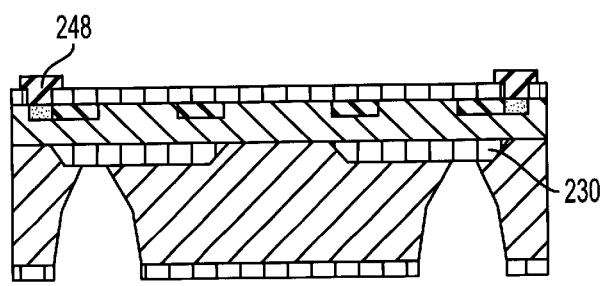

FIG. 10(g): Then, the predetermined portions of the silicon oxide film and the silicon nitride film on the diffusion wirings are removed so as to form contact holes, and the metal wirings 248 are so formed that they are in contact with the diffusion wirings 236 by sputtering or deposition. When aluminum is used, a thermal treatment such as sintering is desirably carried out. For the metal wirings 248, gold, chromium and so on may be used.

Figure 10H:
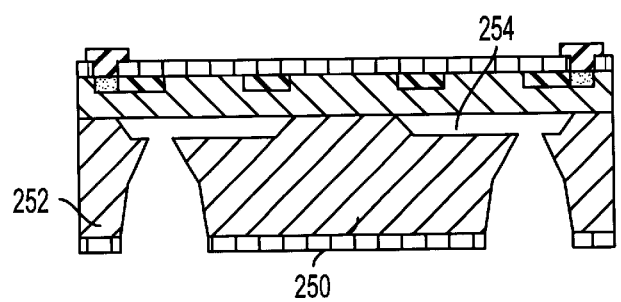

FIG. 10(h): Finally, the sacrificial layer 230 which has functioned as the etching stop layer is removed by etching so as to form the second space 254. For the etching herein, for example a solution containing hydrofluoric acid:nitric acid:acetic acid=1:1 to 3:8 is used. In this case, since the etching speed in the low impurity concentration (diffusion) layer having an impurity concentration not larger than $1.0 \times 10^{17}$ cm$^{-3}$ is reduced to about 1/150 of the etching speed of the diffusion layer having an impurity concentration above $1.0 \times 10^{17}$ cm$^{-3}$, only the low impurity concentration (diffusion) layer can be selectively left. That is, the sacrificial layer 230 in which the impurity is diffused at a high concentration can be selectively etched so that the weight 250 and the support member 252 is separated.

When as described above, the first space is divided into the plural parts, for example two parts and the anisotropic etching is applied for the final part while the mechanical grinding or the RIE is applied for the other parts so that those parts are formed, the volume of the weight 250 can be made large without enlarging the area of the opening 244, whereby the sensitivity of the acceleration sensor can be improved without enlarging a chip area.

Then, an embodiment in which the wiring protection film is formed in the production of the acceleration sensor will be explained with reference to FIG. 11 which schematically shows the production steps of the acceleration sensor.

Figure 11A:
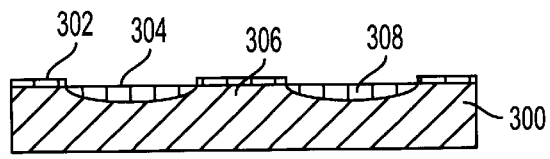
FIGS. 11(*a*) to (*h*) show schematic cross sectional views of the production method for an element according to the present invention including steps for the formation of a wiring protection layer.

FIG. 11(a): On the single crystal silicon substrate 300 as an N-type semiconductor substrate having a thickness of for example 400 to 600 μm and an orientation of crystal plane of (100) is provided a silicon oxide film 302 by for example the thermal oxidation, and then the openings 304 are formed by etching the oxide film 302 with a mask of a photoresist (not shown) having a predetermined pattern followed by the removal of the photoresist through for example the plasma ashing. The openings 304 are formed on those portions which surround the generally rectangular center part 306 of the single crystal silicon substrate 300.

Then, using the silicon oxide film 302 having the openings 304 as the mask, the P-type sacrificial layers 308 are formed in which the P-type impurity such as boron (B) is doped by the deposition and the thermal diffusion or the ion implantation and the annealing treatment of the P-type impurity. It is noted that in place of the silicon oxide film, for example a silicon nitride film is formed, and then the deposition and the thermal diffusion or the ion implantation and the annealing treatment may be carried out using the nitride film as a mask.

Figure 11B:
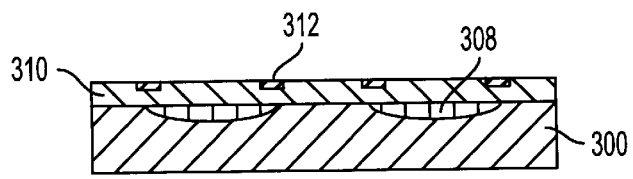

FIG. 11(b): Then, the silicon oxide film 302 is removed by etching. Thereafter, on the side where the buried P-type impurity sacrificial layer 308 is formed in the single crystal silicon substrate 300 is formed the N-type eptaxial layer 310, and then the piezoresistors 312 are formed in the predetermined portions of the flexible parts 338 which are to be formed from the epitaxial layer 310 using the deposition and the thermal diffusion or the ion implantation and the annealing treatment of the P-type impurity. It is noted that since the epitaxial layer 310 is finally formed into the sheet member including the flexible parts 338, it is formed to have a thickness which allows the elastic flexure upon the application of the acceleration.

Figure 11C:
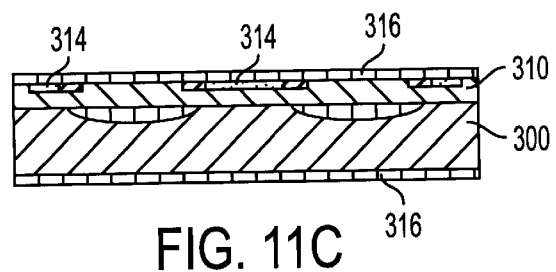

FIG. 11(c): Then, the diffusion wirings 314 are so formed that they are electrically connected to the piezoresistors 312 by the deposition and the thermal diffusion or the ion implantation and the annealing treatment for the high P-type impurity concentration, and then the silicon oxide films 316 are formed on the single crystal silicon substrate 300 and the exposed epitaxial layer 310.

Figure 11D:
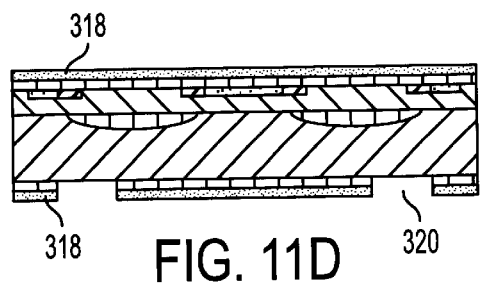

FIG. 11(d): Then, the protection films 318 such as silicon nitride films are formed on the silicon oxide films 316 by for example the CVD process, and then a portion of the protection film 318 and the silicon oxide film 316 is removed by etching, for example, the RIE, so that the opening 320 for the first space 322 is formed which surrounds the weight 336 which will be explained below.

Figure 11E:
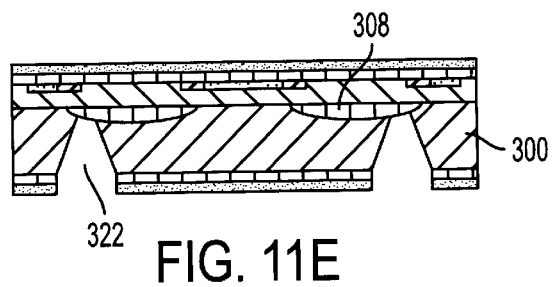

FIG. 11(e): Then, the single crystal silicon substrate 300 is anisotropically etched using as a mask the protection film 318 having the opening 320 and also using an alkaline based etchant such as a potassium hydroxide aqueous solution, so that the first space 322 is formed which reaches the P-type sacrificial layer 308.

Figure 11F:
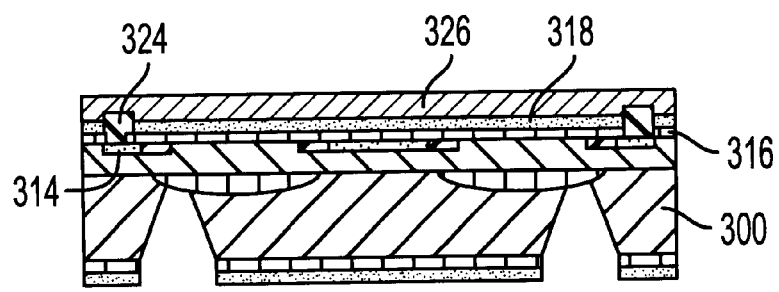

FIG. 11(f): Then, the pre determined portions of the silicone oxide film 316 and the protection film 318 which are on the diffusion wirings 314 are removed by etching, and then the metal wirings 324 (made of for example aluminum) and the electrode pads (not shown) are so formed that they are electrically connected to the diffusion wirings 314, and then the wiring protection film 326 such as a chromium film, a silicon nitride film or a fluoroplastic film is formed on the side of the single crystal silicon substrate 300 having the metal wirings 324.

It is noted that when the conventional aluminum is used for the metal wirings 324, an alloy spike problem may occur above 500° C. Therefore, it is desirable that the wiring protection film 326 of the silicon nitride film is applied in low temperature growth using for example the plasma CVD method.

Figure 11G:
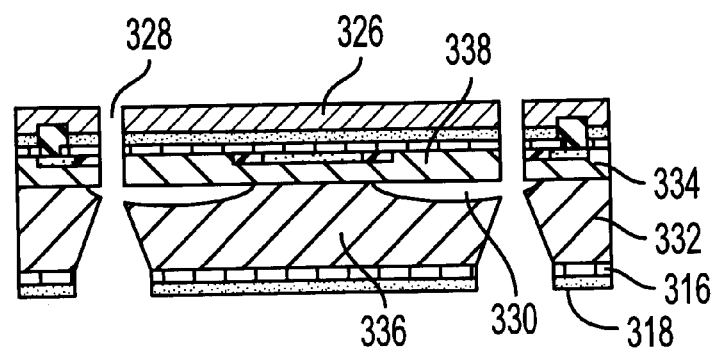

FIG. 11(g): Then, portions of the wiring protection film 326, the protection film 318, the silicon oxide film 316 and the epitaxial layer 310 are removed by the RIE, the anisotropic etching or the isotropic etching, so that the third spaces 328 including the etchant introduction port which reach the buried P-type sacrificial layer 308 are formed. Then, the etchant of an acidic solution containing hydrofluoric acid (hydrofluoric acid:nitric acid:acetic acid=1:1 to 3:8) is supplied through the etchant introduction ports so as to isotropically etch and remove the buried P-type sacrificial layer 308 and the second space 330 is formed, whereby the sheet member 338 is formed of which ends are connected to the frame 334 supported by the support member 332 made of the substrate 300 and made of the epitaxial layer 310, and to which center part the weight 336 is connected.

Figure 11H:
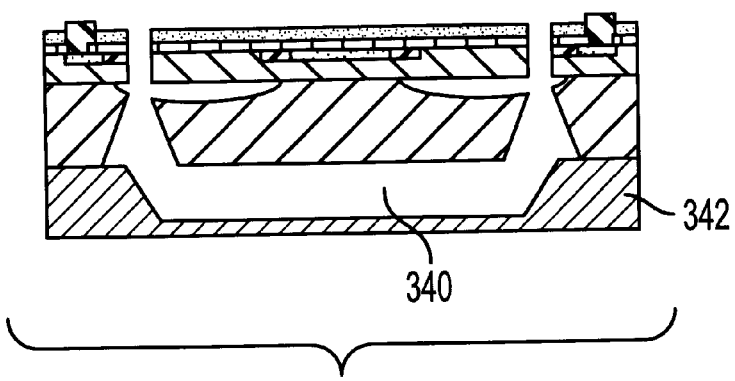

FIG. 11(h): Then, the wiring protection film 326 as well as those portions of the silicon oxide film 316 and the protection film 318 which are on the side of the bottom surface of the weight 338 are removed by etching. Finally, the stopper (or the bottom cover) 342 which contains the recess part 340 in a portion thereof corresponding to the weight 336 is connected to the support member 332 by for example anode bonding, which results in the acceleration sensor according to the present invention.

Another embodiment in which the wiring protection film is formed is shown in FIG. 12. Up to the formation of the silicon oxide film 316, this embodiment is similar to FIG. 11, and thus the explanations up to the formation of the silicon oxide film 316 are omitted.

Figure 12A:
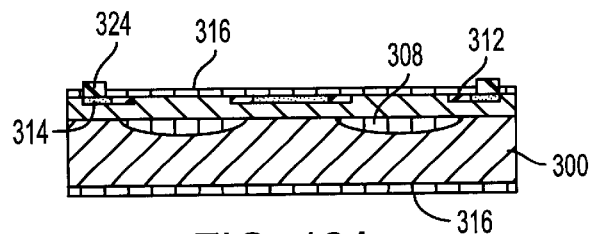
FIGS. 12(*a*) to (*e*) show schematic cross sectional views of the production method for an element according to the present invention including other steps for the formation of a wiring protection layer.

FIG. 12(a): Thereafter, the predetermined portions of the silicone oxide film 316 which are on the diffusion wirings 314 are removed by etching, and then the metal wirings 324 (made of for example aluminum) and the electrode pads (not shown) are so formed by for example the sputtering or the vapor deposition that they are electrically connected to the diffusion wirings 314.

Figure 12B:
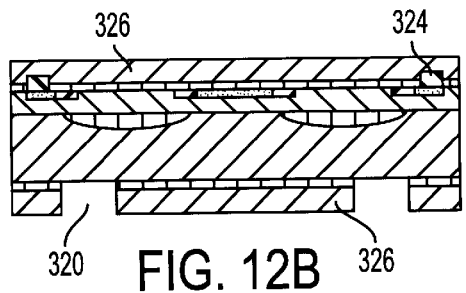

FIG. 12(b): Then, the wiring protection films 326 of the silicon nitride films are formed on the both silicon oxide films 316 by for example the CVD, and then a portion of the wiring protection film 326 and the silicon oxide film 316 is removed by etching, for example, the RIE, so that the opening 320 for the first space 322 is formed. It is noted that the wiring protection film 326 are so formed that it covers the metal wirings 324 and the electrode pads (not shown).

Figure 12C:
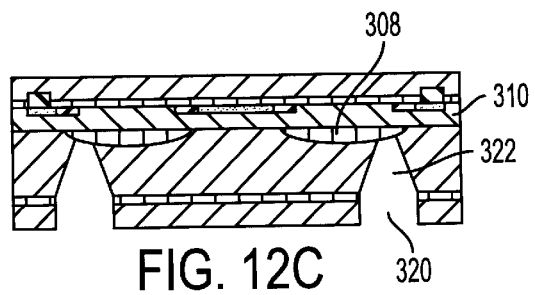

FIG. 12(c): Then, the single crystal silicon substrate 300 is anisotropically etched using as a mask the wiring protection film 326 having the opening 320, so that the first space 322 is formed which reaches the sacrificial layer 308.

Figure 12D:
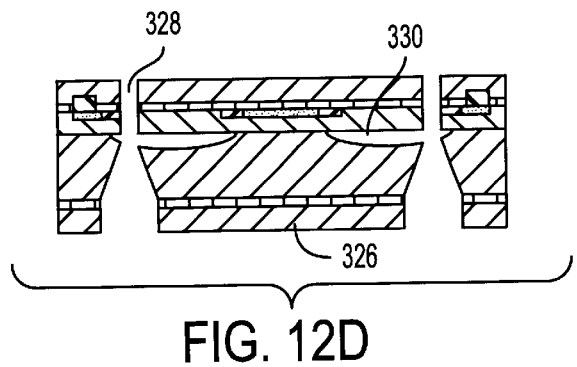

FIG. 12(d): Then, portions of the wiring protection film 326, the silicon oxide film 316 and the epitaxial layer 310 are removed by etching, for example the RIE, the isotropic etching or the anisotropic etching so that the third space 328 which reaches the sacrificial layer 308 is formed. Through the third space 328, the etchant comprising an acidic solution which contains hydrofluoric acid and so on (a solution containing hydrofluoric acid:nitric acid:acetic acid=1:1 to 3:8) is supplied so as to remove the sacrificial layer 308.

Figure 12E:
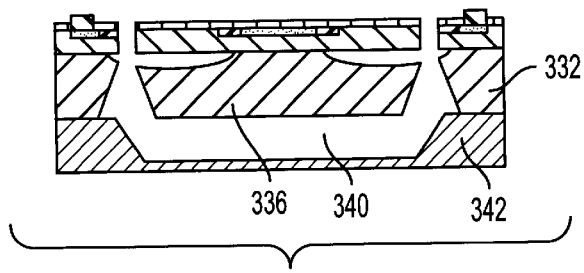

FIG. 12(e): Finally, the wiring protection films 326 are removed, and then the stopper (or the bottom cover) 342 which contains the recess part 340 in a portion thereof corresponding to the weight 336 is connected to the support member 332 by for example anodic bonding, which results in the acceleration sensor according to the present invention.

It is noted that in the embodiment shown in FIG. 12, the wiring protection films 326 are removed from the whole of the surfaces, but the present invention is not limited to this embodiment. Only those portions of the wiring protection film 326 which are on the electrode pads may be thinned beforehand by pattern etching, and then the wiring protection film 326 is etched over its entire surface to reduce the thickness of the film 326 after the etching of the sacrificial layer 308, so that only the electrode pads are exposed. In this way, the other portions but the electrode pads are covered by the silicon nitride film, which improves the moisture resistance of the sensor element. The reasons why the wiring protection film 326 on the electrode pads are thinned beforehand by the pattern etching are that the substrate has irregularities on its surface after the etching of the sacrificial layer 308 and also has a less strength so that a pattern processing (for example, a photolithography step) becomes difficult, and that when the only portions of the wiring protection film 326 on the electrode pads are thinned beforehand by the pattern etching, only the electrode pads are exposed by etching the wiring protection film 326 over its entire surface without the pattern processing after the etching removal of the sacrificial layer 308.

In a further embodiment, the first space 322 is partially formed so that a portion 350 of the substrate is left between the sacrificial layer 308 and the first space 322, then the sacrificial layer is removed, and then the left portion 350 of the substrate is removed. In this embodiment, even after the etching of the sacrificial layer 308, the weight 336 and the support member 332 are not separated so that no breakage of the substrate occurs in this step, which greatly improves the yield of the substrate.

More concretely, such an embodiment will be explained with reference to FIG. 13.

Figure 13A:
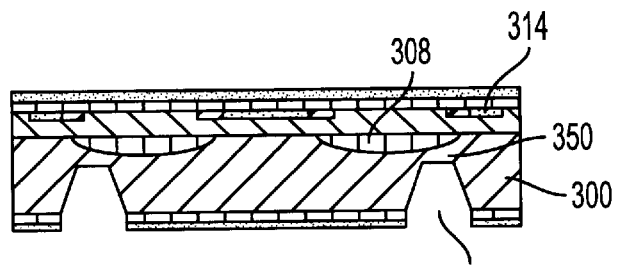
FIGS. 13(*a*) to (*d*) show schematic cross sectional views of the production method for an element according to the present invention including further other steps for the formation of a wiring protection layer.

FIG. 13(a): The first space 322 is formed by the anisotropic etching using the etchant of an alkaline solution such as a potassium hydroxide (KOH) solution. Upon this, the etching is stopped before the first space 322 reaches the sacrificial layer 308 so that the portion 350 of the single crystal silicon substrate having a thickness of for example several tens of micrometers is left below the sacrificial layer 308.

Figure 13B:
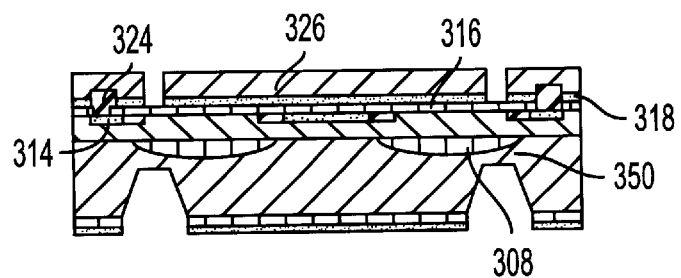

FIG. 13(b): Then, the predetermined portions of the silicon oxide film 316 and the protection film 318 on the diffusion wirings 314 are removed by etching, then the metal wirings 324 (made of for example aluminum) and the electrode pads (not shown) are so formed that they are electrically connected to the diffusion wirings 314, and then wiring protection film 326 such as a chromium film, a silicon nitride film or a fluoroplastic film is formed on the side of the single crystal silicon substrate 300 which side contains the metal wirings 324.

Figure 13C:
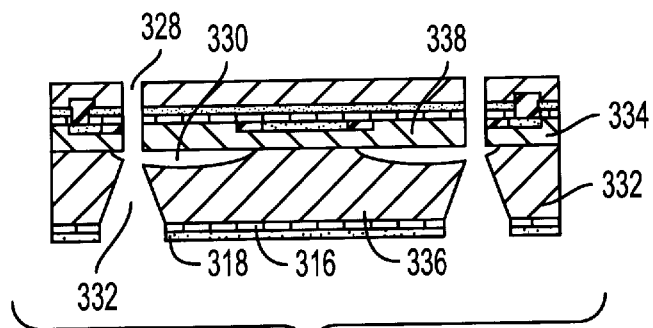
Figure 13D:
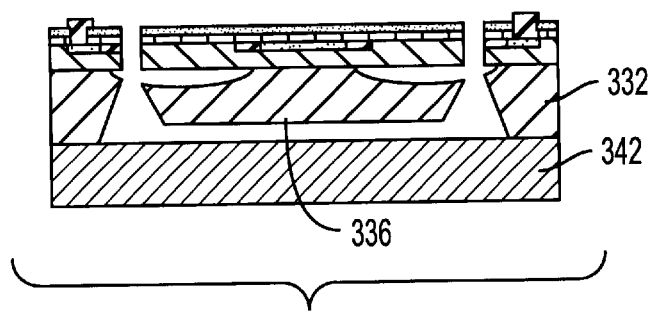

FIG. 13(c): Then, as in the embodiment shown in FIG. 12, the third space 328 is formed, through which the etchant of an acidic solution containing hydrofluoric acid is then supplied so as to isotropically etch and remove the sacrificial layer 308 and thereby the second space 330 is formed. Then, the portion 350 of the single crystal silicon substrate below the sacrificial layer 308 is removed by etching, for example, the RIE or the anisotropic etching so that the first space 322 is connected to the second space 330.

It is noted that the shape of the portion 350 of the single crystal silicone substrate which is left below the buried sacrificial layer 308 after the etching depends on the etching way, and the anisotropic etching using an alkaline etchant provides the larger tapering angle ($\theta_1$) of FIG. 9 compared with the RIE. Thus, when an area which the element occupies is fixed, the RIE provides the larger size for the weight. This also means that when the size of the weight is fixed, the RIE provides the smaller chip compared with the wet anisotropic etching.

In a further embodiment, after the silicone oxide film 316 and the protection film 318 on a bottom surface of a portion which is to be the weight are removed by etching, the single crystal silicon substrate portion 350 left below the buried sacrificial layer 308 and the bottom surface of the portion which is to be the weight bottom are removed by the anisotropic etching using the alkaline etchant or the RIE while using the protection film 318 on the support member 332 as a mask. In this embodiment, the thickness of the weight 336 is reduced, and the stopper 342 having a flat form is connected to the support member 332 by for example anodic bonding (see FIG. 13(d)). In this way, no recess part has to be formed in the stopper 342, which delete the processing cost of the stopper, whereby resulting the reduced production cost of the chip.

Then, an embodiment will be explained in which the concentration of the impurity in the surface of the sacrificial layer is smaller than that of an inner side thereof.

FIG. 14 shows a formation method for the buried sacrificial layer having an aimed final depth of 10 μm.

Figure 14A:
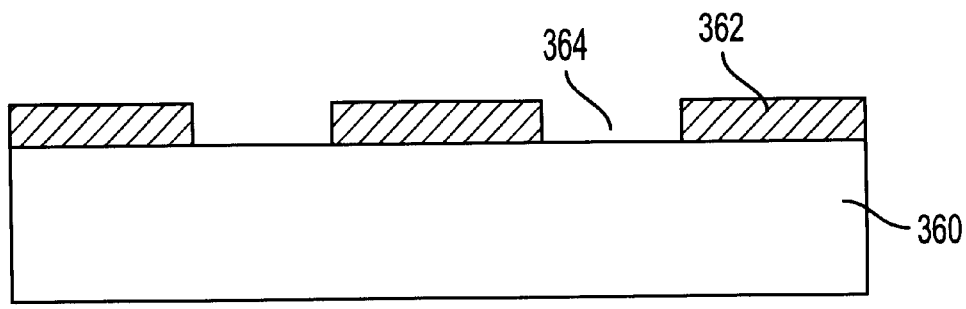
FIGS. 14(*a*) to (*c*) shows schematic cross sectional views of one example of formation steps of a sacrificial layer having a small impurity concentration in a surface portion thereof.

FIG. 14(a): First, a field oxide film 362 having a thickness of about 12000 Å is formed on the surface of the N-type silicon substrate 360 by for example the thermal oxidation. The oxide film is patterned as predetermined using the photolithography and the etching so as to form the openings 364.

Figure 14B:
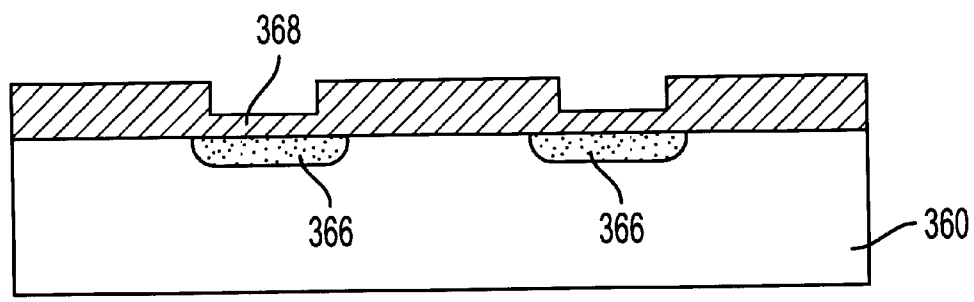

FIG. 14(b): Subsequently, using the field oxide film 362 as a mask, boron as the P-type impurity is deposited and then thermally diffused in a nitrogen atmosphere at the surface of the silicon substrate 360 so as to form the P-type impurity high concentration layer 366 having a depth of about 5 μm. Then, the silicon oxide film 368 having a thickness of about 3500 Å is formed in the substrate surface in the opening 364 by the wet oxidation or pyrogenic oxidation. For example, while the impurity concentration at the surface of the high P-type impurity concentration layer 366 in the case of only the thermal diffusion under the nitrogen atmosphere is about $1 \times 10^{20}$ cm$^{-3}$, the concentration is reduced to about $4 \times 10^{19}$ cm$^{-3}$ when the additional wet oxidation or pyrogenic oxidation is carried out.

Figure 14C:
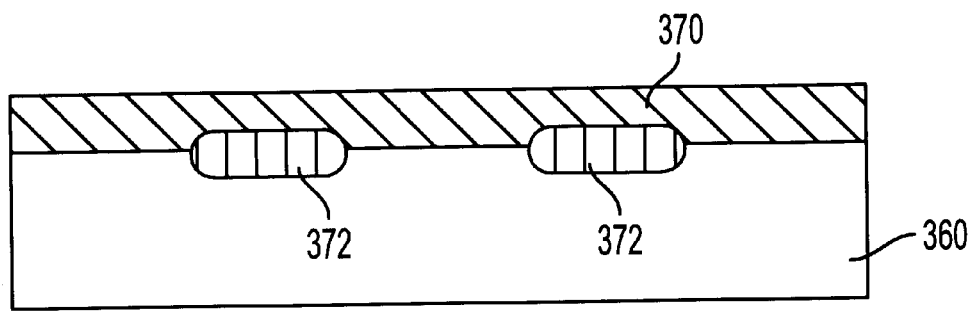

FIG. 14(c): Then, the field oxide film 362 and the silicon oxide film 368 are fully removed by the wet etching over the entire surface followed by the deposition of the N-type epitaxial layer 370. At this stage, boron diffuses into the epitaxical layer 370 through an interface with the silicon substrate 360 and a final buried diffusion layer 372 is formed.

In this embodiment, when a silicon substrate having an impurity concentration of for example $1 \times 10^{15}$ cm$^{-3}$, boron diffuses into the eptaxial layer 370 by about 4–5 μm without the wet oxidation or pyrogenic oxidation while about 3.5 μm with the wet oxidation or pyrogenic oxidation, and also the thickness of inversion layer formed by the auto-doping is about 5 μm without the wet oxidation or pyrogenic oxidation while being reduced to about 2.5 μm with the wet oxidation or pyrogenic oxidation. Further, the peak concentration in the inversion layer is in the order of $10^{16}$ cm$^{-3}$ without the wet oxidation or pyrogenic oxidation while being reduced to about the order of $10^{15}$ cm$^{-3}$ with the wet oxidation or pyrogenic oxidation.

FIG. 15 shows another embodiment in which the concentration of the impurity in the surface of the sacrificial layer is smaller than that of the inner side thereof.

Figure 15A:
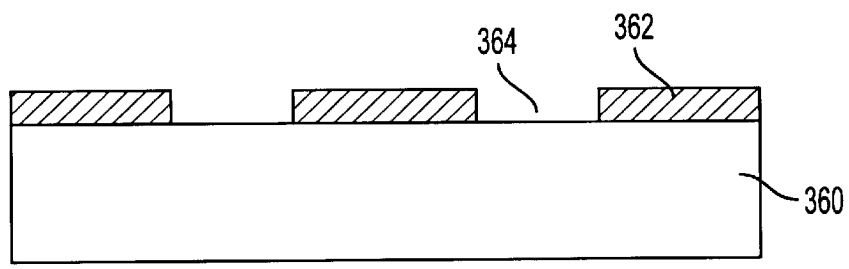
FIGS. 15(*a*) to (*d*) shows schematic cross sectional views of another example of the formation steps of a sacrificial layer having a small impurity concentration in a surface portion thereof.

FIG. 15(a): First, a field oxide film 362 having a thickness of about 5000 Å is formed on the surface of the N-type silicon substrate 360 by for example the thermal oxidation. The oxide film is patterned as predetermined using the photolithography and the etching so as to form the openings 364.

Figure 15B:
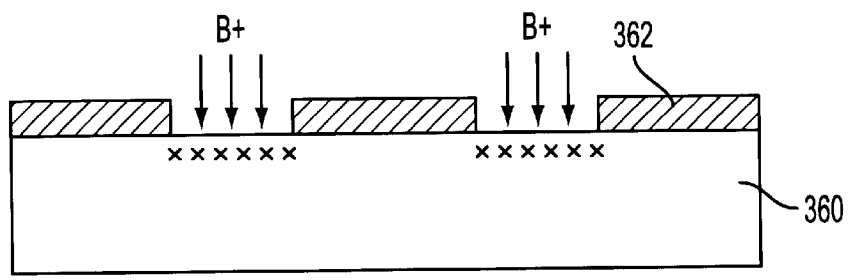

FIG. 15(b): Subsequently, using the field oxide film 362 as a mask, boron as the P-type impurity is ion implanted in the surface of the silicon substrate 360.

Figure 15C:
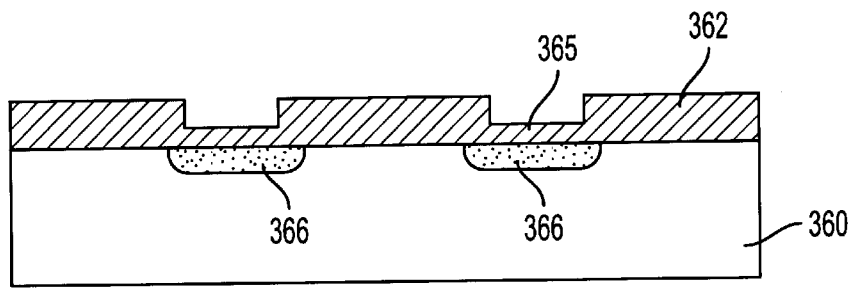

FIG. 15(c): By annealing under an oxygen atmosphere, the silicone oxide film 365 and the high P-type impurity concentration layer 366 below the film are formed.

It is known that a peak of an impurity profile along the thickness direction just after the ion implantation appears in a portion which is inner side a little from the implantation surface due to so-called the channeling effect. The peak position from the surface is determined by the kind of impurity and an acceleration energy upon the implantation. For example, when boron is ion-implanted with an acceleration energy of 100 keV, the peak appears at a point which is about 0.25 μm inside from the implantation surface Considering a fixed peak concentration, an impurity concentration at the surface is lower when the peak position is deeper. In the embodiment shown in FIG. 15, anything such as a protection oxide film is not formed on the surface of the opening 364 of the substrate, and the silicon substrate 360 is exposed. Since the ion implantation is carried out into such a surface, when compared with the presence of for example the protection film in the surface of the silicon substrate, the peak of the impurity profile is located at a deeper position from the surface and simultaneously the surface of the substrate has a lower impurity concentration. Even when the diffusion toward the inside of the substrate proceeds by the annealing treatment thereafter, since the concentration profile is not changed, only the surface P-type impurity concentration can be suppressed lower while keeping an overall impurity concentration in the high P-type impurity concentration layer 366 around $1.0 \times 10^{20}$ cm$^{-3}$ by properly selecting the ion-implantation conditions and the annealing treatment conditions thereafter.

It is noted that when the annealing treatment is carried out under a nitrogen atmosphere, the sacrificial layer remains exposed in the opening, but when the annealing treatment is carried out under an oxygen atmosphere, the opening is covered with the silicon oxide film. Implanted impurity is likely to escape into the oxide film, so that the impurity concentration in the substrate surface is preferably lower compared when the oxide film is absent.

Figure 15D:
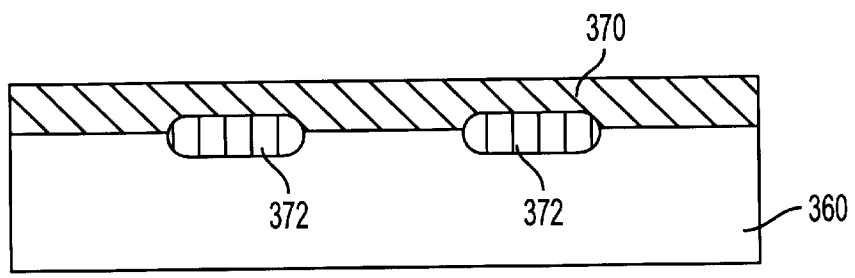

FIG. 15(d): Then, the field oxide film 362 and the silicon oxide film 365 are fully removed from the entire surface of the substrate, and then an N-type epitaxial layer 370 is deposited thereon. At this stage, boron diffuses into the eptaxial layer 370 through the interface with silicon substrate 360 so that the final sacrificial layer 372 is formed.

FIG. 16 shows a further formation method for the sacrificial layer having an aimed final depth of 10 μm.

Figure 16A:
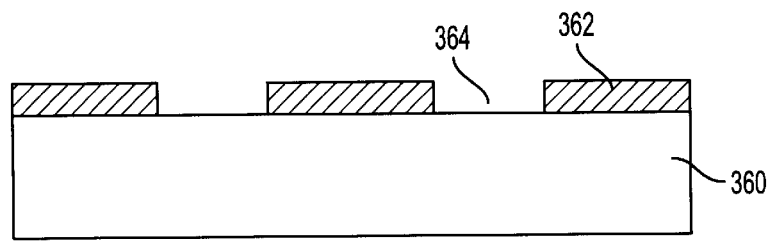
FIGS. 16(*a*) to (*e*) shows schematic cross sectional views of a further example of the formation steps of a sacrificial layer having a small impurity concentration in a surface portion thereof.

FIG. 16(a): First, a field oxide film 362 having a thickness of about 12000 Å is formed on the surface of the N-type silicon substrate 360 by for example the thermal oxidation. The oxide film is patterned as predetermined using the photolithography and the etching so as to form the openings 364.

Figure 16B:
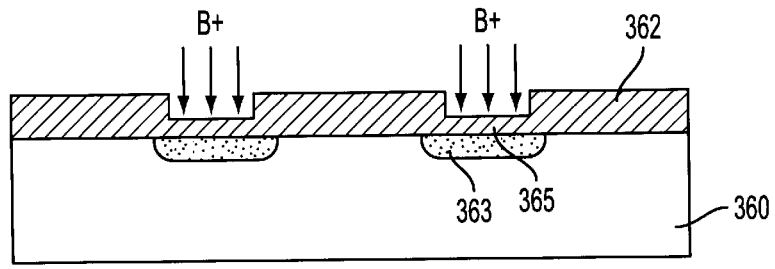

FIG. 16(b): Subsequently, using the field oxide film 362 as a mask, boron as the P-type impurity is deposited on the surface of the silicon substrate 360 and then thermally diffused in an oxygen atmosphere, and the silicon oxide film 365 in the opening 364 and the high impurity concentration layer 363 below it a reformed.

Figure 16C:
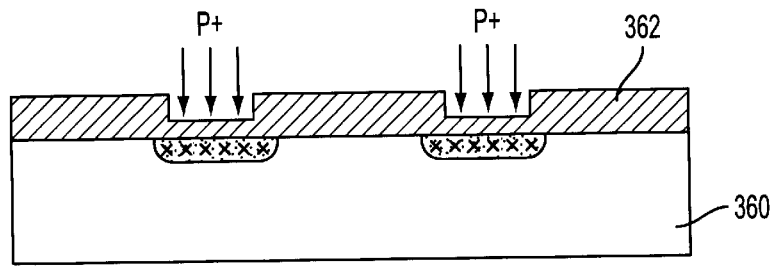

FIG. 16(c): Similarly, using the field oxide film 362 as a mask, phosphorous as the N-type impurity is implanted.

Figure 16D:
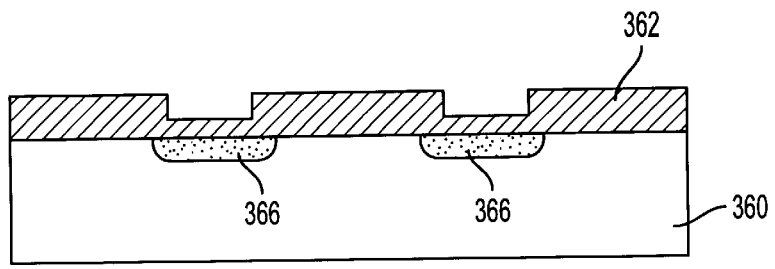

FIG. 16(d): By annealing treatment in a nitrogen atmosphere, the high P-type impurity concentration layer 366 having a depth of about 5 μm is formed. In this step, the ion implantation conditions for phosphorous have to be so optimally selected that no inversion of the conductivity type occurs in the high P-type impurity concentration layer 366.

Figure 16E:
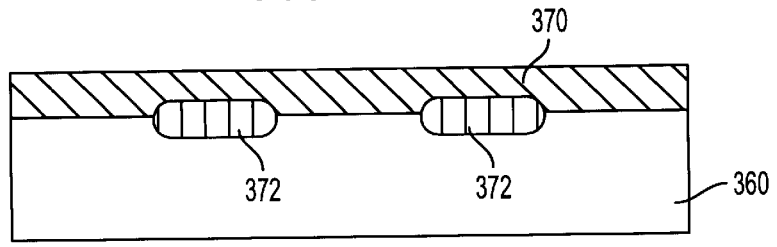

FIG. 16(e): Then, the field oxide film 362 and the silicon oxide film 368 are fully removed by the wet etching over the entire surface followed by the deposition of an N-type epitaxial layer 370. At this stage, the impurity diffuses into the epitaxical layer 370 through the interface with the silicon substrate 360 and the final buried diffusion layer 372 is formed. Since boron as the P-type impurity and phosphorous as the N-type impurity are both present near the surface of the sacrificial layer 372, each impurity escapes into the atmosphere upon the formation of the epitaxial layer and trapped into the eptaxial layer, both are compensated with each other, which suppress the formation of the inversion layer. Also, each impurity diffuses into the epitaxial layer side 370 through the surface of the silicon substrate 360, the both are compensated with each other, so that the depth of the P-type impurity layer formed in the eptaxial layer is suppressed.

In a further embodiment, when the sacrificial layer is formed in the substrate, the impurity concentration of at least the epitaxial layer selected from the eptaxial layer and the substrate is made larger than the concentration of the impurity of the sacrificial layer which can be taken into the eptaxial layer through auto-doping upon the epitaxial growth.

Concretely, in the case in which the impurity concentration of the peak in the inversion layer as the sacrificial layer to be formed is intended to be suppressed to about $7\times10^{15}$ cm$^{-3}$, for example when the epitaxial layer was grown using the silicone substrate having an impurity concentration of $1\times10^{15}$ cm$^{-3}$, and it was observed that the concentration of the impurity which is actually taken into the epitaxial layer is about $8\times10^{15}$ cm$^{-3}$ due to the auto-doping, another silicon substrate having an impurity concentration (for example $1\times10^{16}$ cm$^{-3}$) which is larger than that of the above used silicon substrate is used for the epitaxial growth which provides the impurity concentration of $1\times10^{16}$ cm$^{-3}$ of the epitaxial layer. It is noted that when the impurity concentration of about $1\times10^{15}$ cm$^{-3}$ is required at an outermost surface (the surface on which the piezoresistor is formed) of the eptaxial layer, the eptaxial growth may be so carried out using a silicon substrate having an impurity concentration of $1\times10^{16}$ cm$^{-3}$ that the impurity concentration is continuously changed from $1\times10^{16}$ cm$^{-3}$ to $1\times10^{15}$ cm$^{-3}$ when the epitaxial layer is formed.

Figure 17:
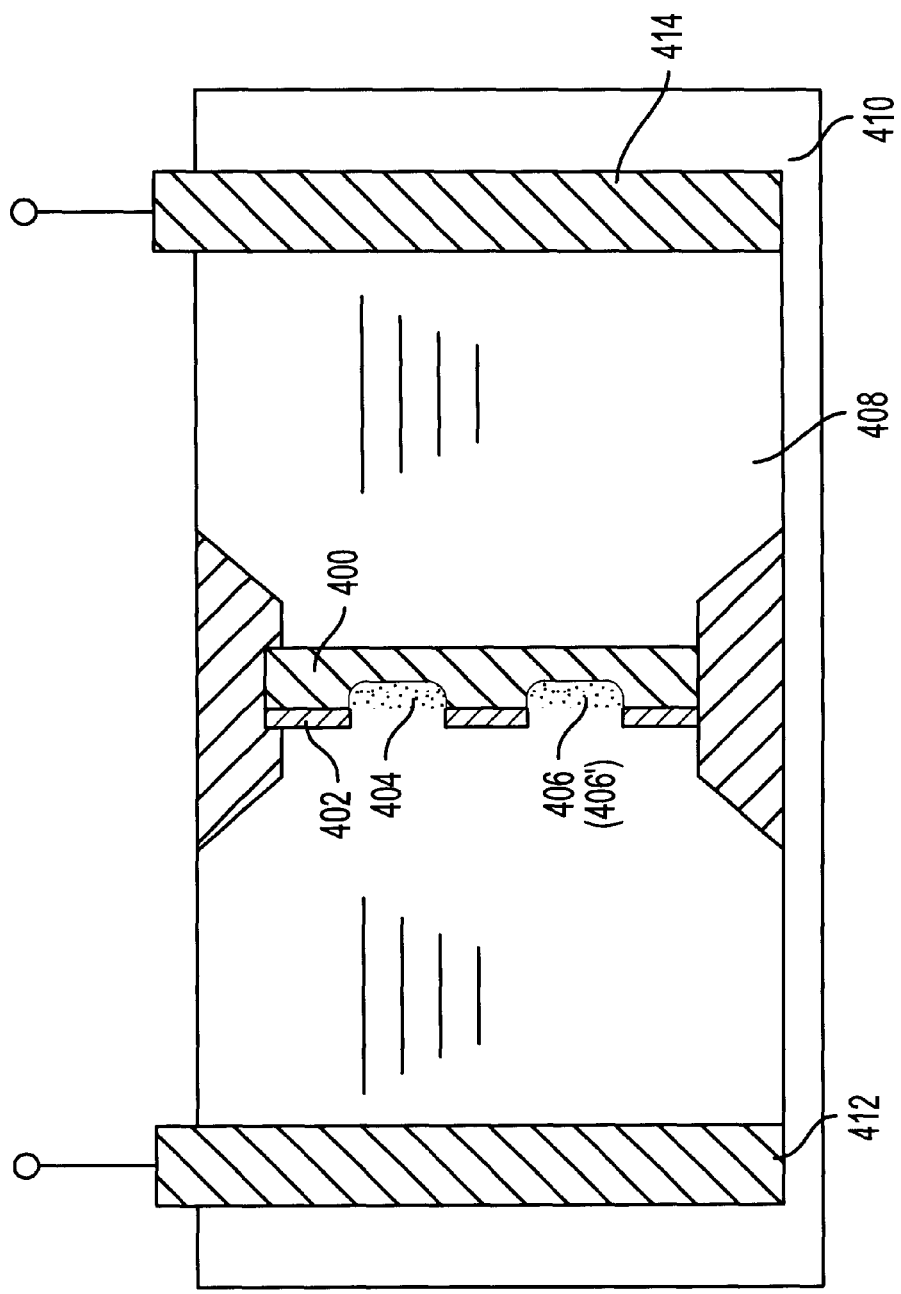
FIG. 17 schematically shows a perspective view of an apparatus for the production of a porous silicon layer as a sacrificial layer.
Figure 18:
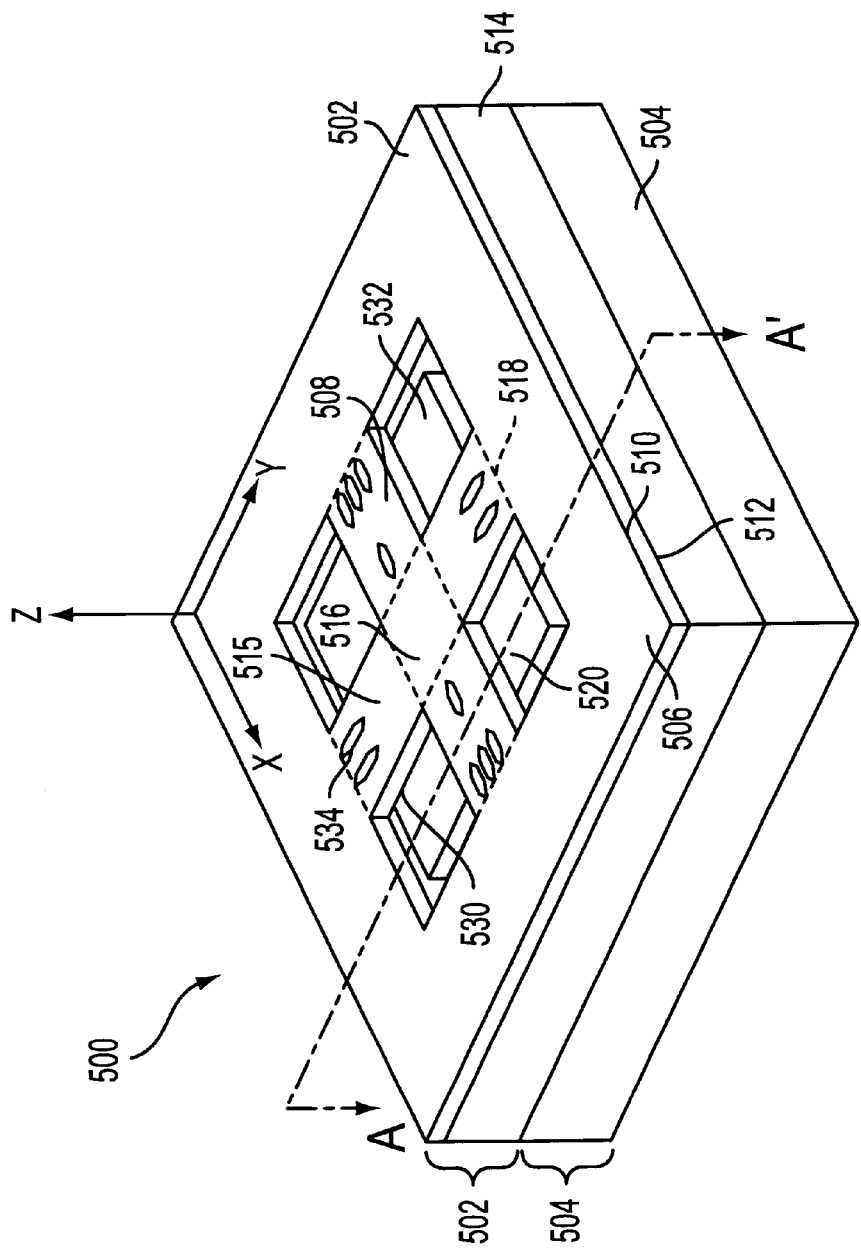
FIG. 18 shows a schematic cross sectional view of a piezoresistor-type acceleration sensor which has been known from the prior art.
Figure 19:
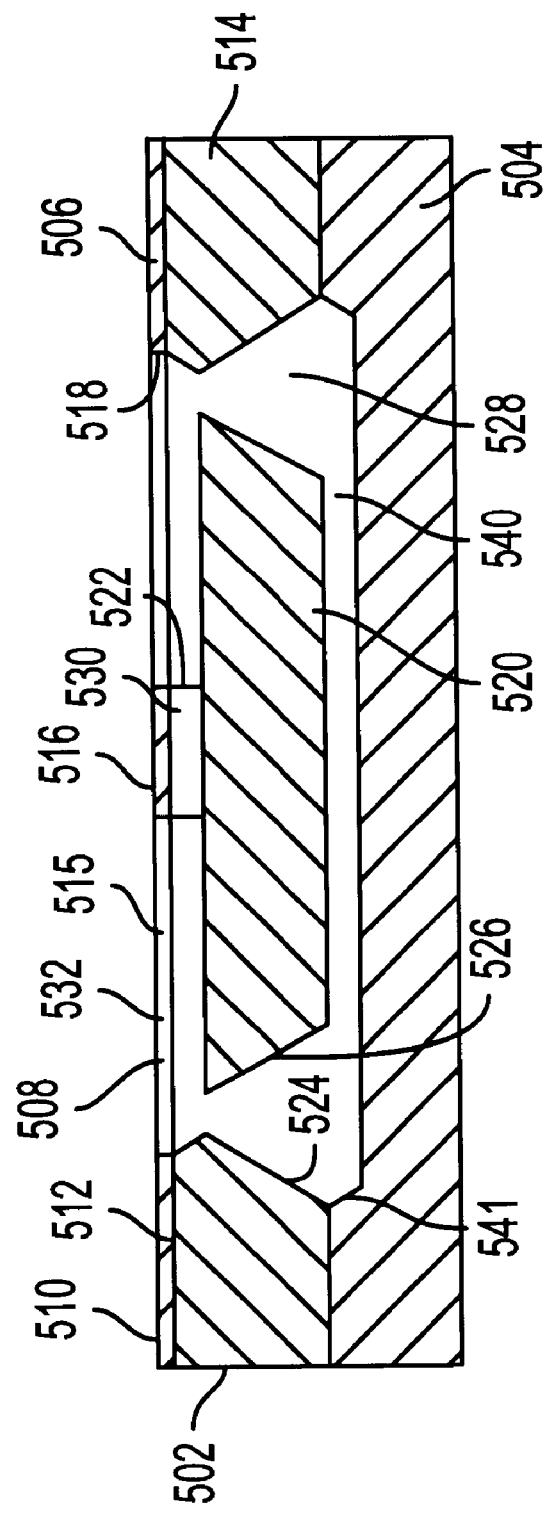
FIG. 19 shows a schematic cross sectional view of the acceleration sensor of FIG. 18.
Figure 20A:
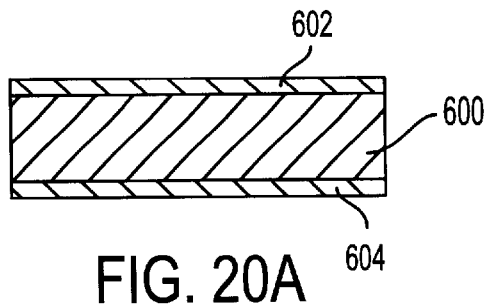
FIGS. 20(*a*) to (*f*) show in cross sectional views, a series of production steps of the acceleration sensor of FIG. 18.
Figure 20B:
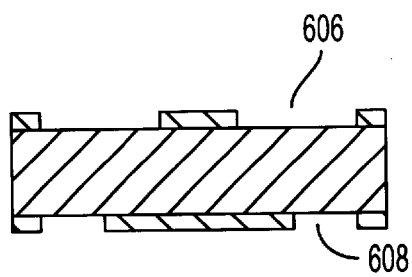
Figure 20C:
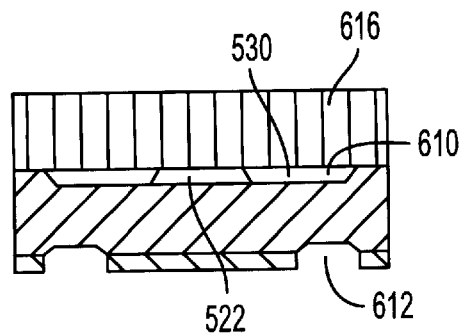
Figure 20D:
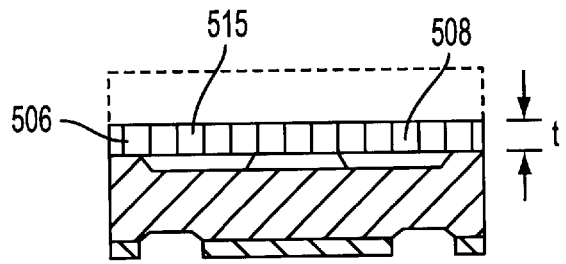
Figure 20E:
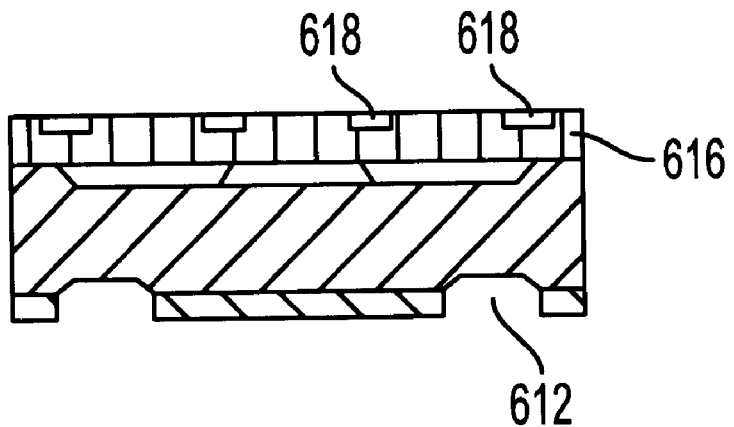
Figure 20F:
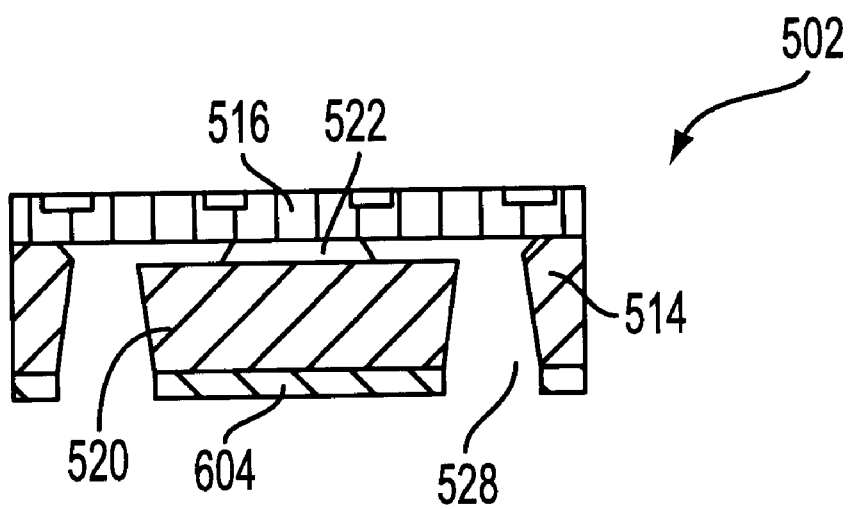

Then, the formation of the porous silicon layer as the sacrificial layer will be explained concretely with reference to FIG. 17.

After the silicon oxide film 402 is formed on one of the main surfaces of the semiconductor substrate 400 (for example, a single crystal silicon substrate), an opening 404 is formed on a portion where the sacrificial layer is to be formed. Through the opening 404 is diffused either the P-type (for example boron) or the N-type (for example phosphorous) impurity so as to form the buried layer 406. As shown in FIG. 17, such a substrate is placed as a diaphragm (or a partition membrane) in the electrolysis vessel 410 which contains an electrolyte solution 408 comprising for example hydrofluoric acid, and the porous silicon layer 406' as the sacrificial layer is formed by anodic oxidation.

In this step, the substrate is preferably enclosed by a protection film such as a silicon oxide film except the buried layer 406. The silicon substrate 400 is placed between the two platinum electrodes 412 and 414 to which a direct current source is applied from the outside. By the application of the power from the outside, a fluoride ion is generated in the electrolyte, which reacts with a silicon atom of the buried layer 406 as the sacrificial layer to produce silicon tetrafluoride ($SiF_4$) and hydrogen. Thereby, a portion of the impurity layer is dissolved, so that fine pores are formed in the impurity layer, resulting in the porous silicon layer. Thereafter, the substrate is washed with water and then dried for the next treatment.

It is noted that in place of the silicon oxide film 402, a silicon nitride film or a fluoroplastic material may be used for the mask of the electrolyte solution treatment. The porous silicon thus produced can be used for the element according to the present invention.

Figure 21:
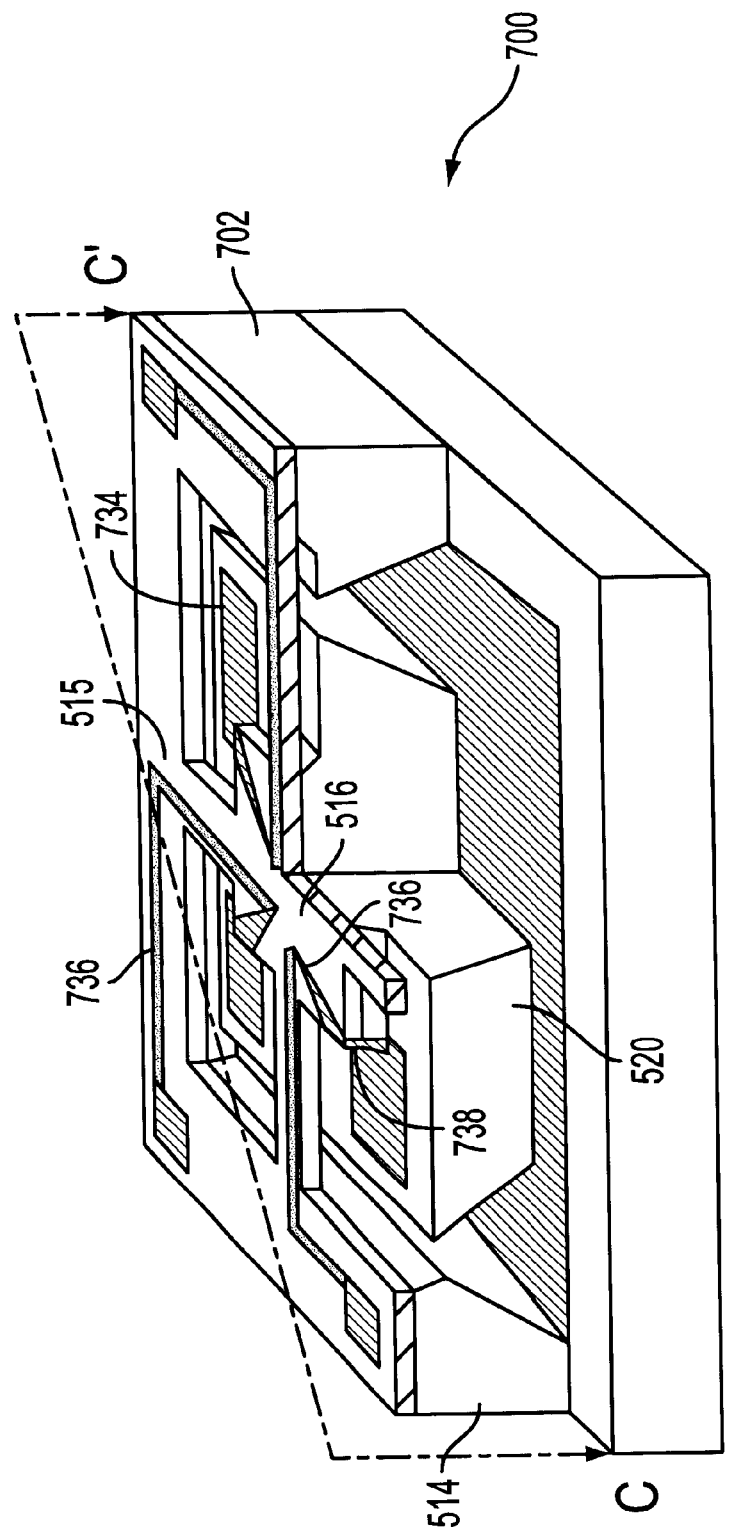
FIG. 21 shows a schematic partially cut-away cross sectional view of an electrostatic capacitance-type acceleration sensor which has been known from the prior art.
Figure 22:
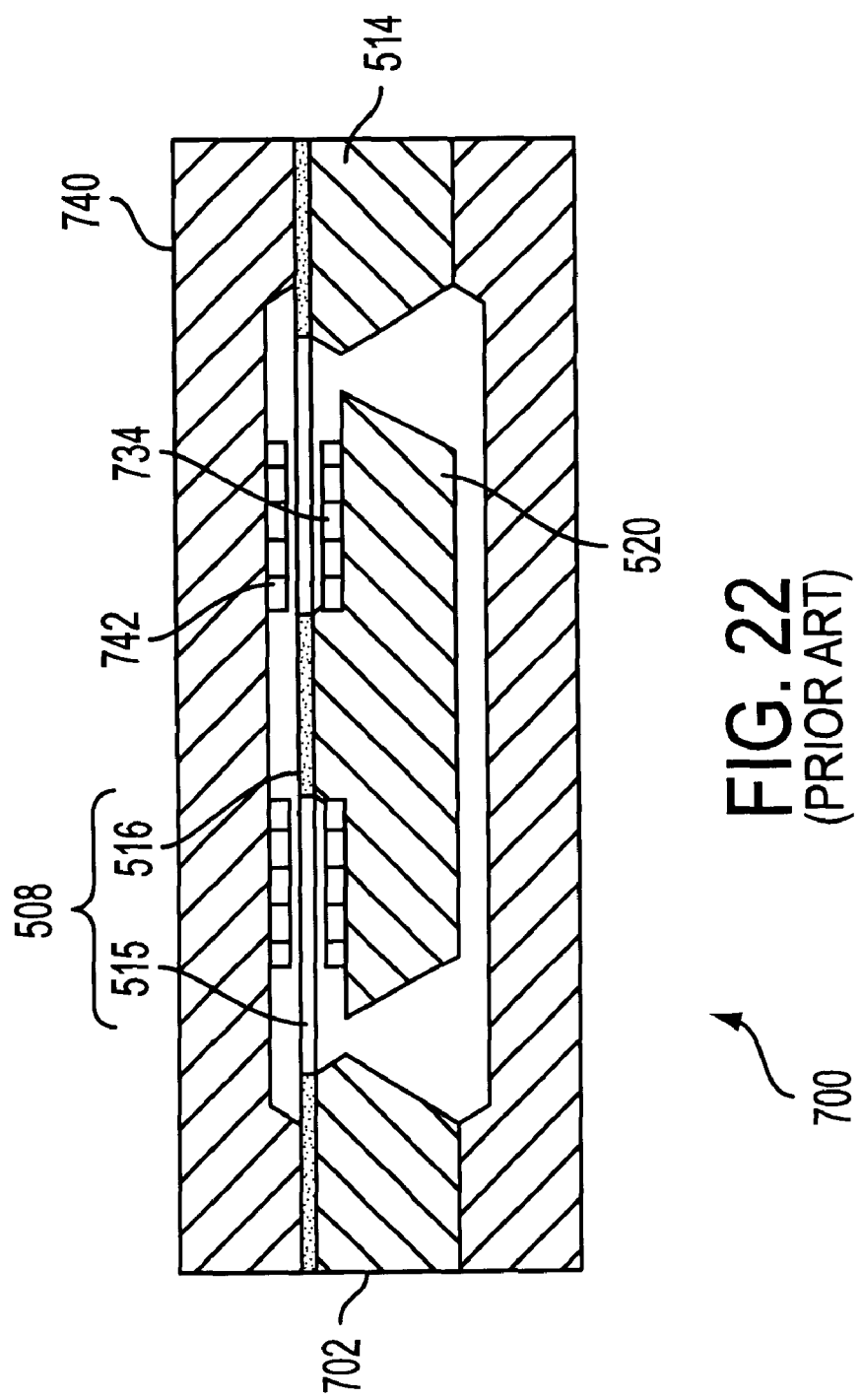
FIG. 22 shows a schematic cross sectional view of the acceleration sensor of FIG. 21.

The present invention provides the element for in addition to the piezoresistor-type acceleration sensor, the electrostatic capacitance-type acceleration sensor, and also the production method for the same as well as the sensor in which the element is used. The element used for the electrostatic capacitance-type acceleration sensor is substantially different only in that the electrode for the electrostatic capacitance measurement is used in place of the piezoresistors. Therefore, the constitutions of the element for the electrostatic capacitance-type acceleration sensor and also the production method for the same are obvious for those skilled in the art according to the above descriptions as to the element for the piezoresistor-type acceleration sensor of the present invention. Also, it is obvious for those skilled in the art that the electrostatic capacitance-type acceleration sensor is provided by connecting the top cover onto the element which cover includes the electrode opposed to the capacitance measurement electrode of the element. The concrete arrangement of the electrodes onto the element may be for example the same as in the embodiment shown in FIG. 21, or as shown in FIG. 1 in which the electrodes 734 are arranged (only one electrode is shown with the broken line).

What is claimed is:

1. A flexure transducer element which is used in an acceleration sensor for sensing an acceleration applied thereto comprises (1) a frame having an upper surface and a lower surface, (2) a sheet member which has a plurality of flexible parts and a center part, each flexible part extending between at least a portion of an inner edge of the frame and the center part and being integrally connected to them, (3) a weight which has a neck part integrally connected to the center part of the sheet member and which is hung from the sheet member through the neck part, and (4) a support member which supports the lower surface of the frame and of which inward side surface of said support member faces to a side surface of the weight through a first space therebetween, the sheet member further includes a weight upper part which is located on the upper surface of the weight, and the upper weight part is integral with the weight, a second space which is continuous with the first space is defined between each flexible part of the sheet member and the weight, a third space is defined between the frame and the sheet member and/or through the sheet member, the frame and the sheet member are connected to each other and the sheet member and the weight are connected to each other in such a manner that, when the acceleration is applied to the element, at least two flexible parts are elastically deformed so that the weight is displaced relatively to the frame, the weight and the support member are formed of a semiconductor substrate, the second space is formed by removing a sacrificial layer which is provided in the semiconductor substrate, and the frame and the sheet member comprises an epitaxial layer provided on the semiconductor substrate.

2. The element according to claim 1 which is used in the acceleration sensor for sensing the acceleration as a resistance change due to elastic deformation of at least two flexible parts wherein each of said at least two flexible parts comprises at least one piezoresistor, and the sheet member comprises wirings connected to the piezoresistors.

3. The element according to claim 1 which is used in the acceleration sensor for sensing an acceleration as an electrostatic capacitance change due to elastic deformation of at least two flexible parts and which comprises at least one electrode which is located on a portion of the sheet member or weight which is displaced by the displacement of the weight relatively to the frame and a wiring connected to the electrode.

4. A method for producing a flexure transducer element used in an acceleration sensor which senses an acceleration applied thereto, in which method, the element comprises a flexure transducer element which is used as an acceleration sensor for sensing an acceleration applied thereto comprises
   (A) a frame having an upper surface and a lower surface,
   (B) a sheet member which has a plurality of flexible parts and a center part, each flexible part extending between at least a portion of an inner edge of the frame and the center part and being integrally connected to them,
   (C) a weight which has a neck part integrally connected to the center part of the sheet member and which is hung from the sheet member through the neck part, and
   (D) a support member which supports the lower surface of the frame and of which inward side surface of said support member faces to a side surface of the weight through a first space therebetween, a second space which is continuous with the first space is defined between each flexible part of the sheet member and the weight, a third space is defined between the frame and the sheet member and the weight, the frame and the sheet member are connected to each other and the sheet member and the weight are connected to each other in such a manner that, when the acceleration is applied to the element, at least two flexible parts are elastically deformed so that the weight is displaced relatively to the frame, the weight and the support member are formed of a semiconductor substrate having a first main surface and a second main surface which are opposing to each other, the second space is formed by removing a sacrificial layer which is provided in the semiconductor substrate, and the frame and the sheet member comprises an epitaxial layer provided on the semiconductor substrate, the method comprising:
   (1) forming in the first main surface of the semiconductor substrate for the formation of the weight having the neck part and the support member, the sacrificial layer which extends outward from a portion of an outer periphery of the center part of the first main surface which center part is to constitute the neck part,
   (2) the epitaxial layer is formed on the first main surface after (1), and
   (3) after (2), carrying out the following (3-a) to (3-c):
      (3-a) removing a portion of the substrate from the second main surface of the substrate using etching so that the side surface of the weight and the support member are formed, the support member including the side surface opposing to the side surface of the weight through the first space,
      (3-b) forming the third space through the epitaxial layer by removing a portion thereof using etching so that at least a portion of the rest of the epitaxial layer is formed into the frame and the sheet member including the center part and a plurality of the flexible parts which finally becomes able to elastically deform, and
      (3-c) removing the sacrificial layer through wet etching so that the second space and the neck part of the weight are formed, whereby the weight is formed, in any one of the following orders (i) to (iv):
         (i) (3-a)→(3-b)→(3-c),
         (ii) (3-a)→(3-c)→(3-b),
         (iii) (3-b)→(3-a)→(3-c), and
         (iv) (3-b)→(3-c)→(3-a).

5. The method according to claim 4 wherein upon the formation of the sacrificial layer on the substrate, an impurity concentration of at least the epitaxial layer selected from the substrate and the epitaxial layer is made higher than a concentration of the impurity which forms the impurity layer and which is taken into the epitaxial layer due to auto-doping upon epitaxial growth.

6. The method according to claim 4 wherein the first space defined by the side surfaces of the support member and the weight is so tapered that a distance between the support member and the weight is reduced in two steps along a direction from the bottom to the neck part of the weight, and the first space is composed of a first part near the bottom of the weight and a second part on the first part, and a first tapering angle formed by the side surfaces of the support member and the weight is smaller than a second tapering angle formed by the side surfaces of the support member.

7. The method according to claim 6 wherein the first part is formed by mechanical grinding, sandblast or the RIE.

8. The method according to claim 4 wherein in step (1), the sacrificial layer is so formed that it surrounds the center part of the first main surface.

9. The method according to claim 4 wherein in step (1), the sacrificial layer is formed as a plurality of elongated layers which symmetrically extend from the center part of the first main surface.

10. The method according to claim 5 wherein the sacrificial layer is an impurity layer which includes an impurity of which conductivity type is opposed to that of the substrate at a higher impurity concentration than that of the substrate, or a porous silicon layer.

11. The method according to claim 10 wherein in the impurity layer of which impurity concentration is higher than that of the substrate, an impurity concentration of a surface portion of the impurity layer is relatively smaller than that of the inside of the impurity layer.

12. The method according to claim 11 wherein the impurity concentration of the surface portion of the impurity layer is made not larger than $5\times10^{19}$ cm$^{-3}$.

13. The method according to claim 11 wherein the impurity layer is formed by deposition and thermal diffusion of the impurity to the substrate followed by wet oxidation or pyrogenic oxidation, so that the impurity concentration of the surface portion of the impurity layer is relatively smaller than that of the inside of the impurity layer.

14. The method according to claim 11 wherein the impurity layer is formed by direct implantation of an impurity ion to the substrate followed by an annealing treatment, so that the impurity concentration of the surface portion of the impurity layer is relatively smaller than that of the inside of the impurity layer.

15. The method according to claim 11 wherein after the formation of the impurity layer, another impurity of which conductivity type is different is doped into a vicinity of the surface portion of the impurity layer, so that the impurity concentration of the surface portion of the impurity layer is relatively smaller than that of the inside of the impurity layer.

16. The method according to claim 4 wherein (3) after (2) includes (3-d) which is carried out before, after or between any two of (3-a) to (3-c) and in which at least one piezoresistor is formed on each of at least two flexible parts, and wirings connected to the piezoresistors are formed on the sheet member.

17. The method according to claim 16 wherein when the etching is carried out after (3-d), at least one protection layer is formed before the etching so that the piezoresistors and the wirings, or the electrode and the wiring are protected.

18. The method according to claim 17 wherein the protection layer is a silicon nitride film or a fluoroplastic film.

19. The method according to claim 17 wherein the wiring further includes a pad electrode, and when the protection layer further protects the pad electrode, a thickness of that portion of the protection layer which is located on the pad electrode is reduced beforehand relatively to the other portion of the protection layer before the etching, and etching over an entire surface of the protection layer is carried out so that only the pad electrode is exposed.

20. The method according to claim 4 wherein step (3) after step (2) includes sub-step (3-e) which is carried out before, after or between any two of sub-steps (3-a) to (3-c) and in which at least one electrode is formed on the sheet member which is displaced by the displacement of the weight relative to the frame or on a portion of an upper surface of the weight and a wiring connected to the electrode is formed.

21. The method according to claim 20 wherein when the etching is carried out after (3-e), at least one protection layer is formed before the etching so that the piezoresistors and the wirings, or the electrode and the wiring are protected.

22. The method according to claim 5 wherein when sub-step (3-c) is carried out after sub-step (3-a), sub-step (3-a) is so carried out that the formed first space reaches the sacrificial layer, and sub-step (3-c) is carried out with supplying an etchant through the first space.

23. The method according to claim 4 wherein when sub-step (3-c) is carried out after sub-step (3-b), sub-step (3-b) is so carried out that the formed third space reaches the sacrificial layer, and sub-step (3-c) is carried out with supplying an etchant through the third space.

24. The method according to claim 4 wherein the third space is so formed that it is located through a portion of the epitaxial layer on the sacrificial layer and/or adjacent to said portion, and the third space leads to the sacrificial layer.

25. The method according to claim 4 wherein a cross sectional shape of the third space parallel to the first main surface is a circle, oval or rectangle having four rounded-corners.

26. The method according to claim 4 wherein when sub-step (3-c) is carried out after sub-step (3-b), sub-step (3-b) is carried out in which the third space is so formed along the flexible part to be formed that the third space is located through a portion of the epitaxial layer on the sacrificial layer and/or adjacent to said portion, and also that the third space reaches the sacrificial layer, and sub-step (3-c) is carried out with supplying an etchant through the third space.

27. The method according to claim 4 wherein at least one flexible part is in the form of a beam which extends from the center part of the sheet member toward the frame, the third space comprises a space which is surrounded by the frame and the at least one flexible part, and sub-step (3-c) is carried out with supplying an etchant through the third space.

28. The method according to claim 4 wherein an opening of the third space through the epitaxial layer which opening is not in contact with the substrate has a size based on such properties of anisotropic etching that when the third space which is being formed reaches the sacrificial layer, step (3-b) is substantially stopped automatically.

29. The method according to claim 4 wherein sub-steps (3-a) and (3-b) are carried out simultaneously.

30. The method according to claim 4 wherein the third space is formed by the RIE.

31. The method according to claim 4 wherein a portion of the epitaxial layer through which the third space is to be formed is formed into a high impurity concentration portion, and sub-step (3-b) is carried out by removing the portion with etching.

32. The method according to claim 20 wherein sub-steps (3-b) and (3-c) are carried out continuously.

33. The method according to claim 4 wherein when sub-step (3-c) is carried out after carrying out sub-steps (3-a) and (3-b), sub-step (3-c) is carried out by supplying the etchant through the first space and the third space.

34. The method according to claim 4 wherein the etching of sub-step (3-a) is stopped before the first space reaches the sacrificial layer so that a portion of the substrate is left between the first space and the sacrificial layer, and after sub-step (3-c), the etching is carried out so that the left portion is removed, whereby the formed second space reaches the first space.

35. The method according to claim 34 wherein the left portion is removed by anisotropic etching in which an etchant based on an alkaline is used or by the RIE.

36. The method according to claim 4 which further comprises the step of etching a bottom surface of the weight so that a thickness of the weight is reduced.

37. The method according to claim 35 wherein etching of the bottom surface of the weight so as to reduce the thickness of the weight is carried out simultaneously with the removal of the left portion.

* * * * *